(12) United States Patent
Kumar Agrawal et al.

(10) Patent No.: US 11,228,671 B2
(45) Date of Patent: *Jan. 18, 2022

(54) METHODS AND SYSTEMS FOR APPLICATION CONTROL IN A HINGED ELECTRONIC DEVICE

(71) Applicant: Motorola Mobility LLC, Chicago, IL (US)

(72) Inventors: Amit Kumar Agrawal, Bangalore (IN); Luciano Bevilacqua Pereira da Silva, Sao Paulo (BR); Toni Pereira, Sao Paulo (BR); Caio Luiz Leal Chagas do Nascimento, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/750,770

(22) Filed: Jan. 23, 2020

(65) Prior Publication Data

US 2020/0314226 A1  Oct. 1, 2020

Related U.S. Application Data

(63) Continuation of application No. 16/363,588, filed on Mar. 25, 2019, now Pat. No. 10,609,192.

(51) Int. Cl.
*H04M 1/00* (2006.01)
*H04M 1/02* (2006.01)
*H04M 1/72403* (2021.01)

(52) U.S. Cl.
CPC ....... *H04M 1/0268* (2013.01); *H04M 1/0216* (2013.01); *H04M 1/72403* (2021.01); *H04M 2250/16* (2013.01)

(58) Field of Classification Search
CPC combination set(s) only.
See application file for complete search history.

(56) References Cited

U.S. PATENT DOCUMENTS 10,609,192 B1 *   3/2020  Kumar Agrawal . H04M 1/0268
2014/0378183 A1 * 12/2014  Xiong ................... G06F 1/1647
                                                        455/556.1

(Continued)

FOREIGN PATENT DOCUMENTS

CN   107967127    4/2018
CN   108459819    8/2018

(Continued)

OTHER PUBLICATIONS

"Office Action", Chinese Application No. 201911189780.8; dated Feb. 3, 2021.

(Continued)

*Primary Examiner* — Justin Y Lee
(74) *Attorney, Agent, or Firm* — Philip H. Burrus, IV

(57) ABSTRACT

An electronic device includes a first device housing coupled to a second device housing by a hinge such that the first device housing is pivotable about the hinge between an axially displaced open position and a closed position. An exterior display is coupled to the electronic device and is exposed when the electronic device is in the closed position. At least one interior display is coupled to electronic device and is concealed when the electronic device is in the axially displaced open position. One or more processors detect user input interacting with two or more notifications presented on the exterior display. When the electronic device transitions to the axially displaced open position, the one or more processors present two or more interactive application por- (Continued)

tals of two or more predefined applications associated with the two or more notifications on the at least one interior display.

20 Claims, 15 Drawing Sheets

(56) References Cited

U.S. PATENT DOCUMENTS

| | | | |
|---|---|---|---|
| 2018/0270343 A1 | 9/2018 | Rout et al. | |
| 2018/0285047 A1 | 10/2018 | Jeune et al. | |
| 2018/0335920 A1* | 11/2018 | Tyler | G06F 3/0488 |
| 2018/0367491 A1 | 12/2018 | Agrawal et al. | |
| 2019/0042066 A1* | 2/2019 | Kim | G06F 3/0482 |

FOREIGN PATENT DOCUMENTS

| | | |
|---|---|---|
| CN | 108536379 | 9/2018 |
| CN | 109104519 | 12/2018 |
| CN | 109343775 | 2/2019 |
| WO | 2017135749 | 8/2017 |

OTHER PUBLICATIONS

Lee, Justin Y., "NonFinal Office Action", U.S. Appl. No. 16/363,588; filed Mar. 25, 2019; dated Nov. 2019.

* cited by examiner

METHODS AND SYSTEMS FOR APPLICATION CONTROL IN A HINGED ELECTRONIC DEVICE

CROSS REFERENCE TO PRIOR APPLICATIONS

This application is a continuation application claiming priority and benefit under 35 U.S.C. § 120 from U.S. application Ser. No. 16/363,588, filed Mar. 25, 2019, which is incorporated by reference for all purposes.

BACKGROUND

Technical Field

This disclosure relates generally to electronic devices and corresponding methods, and more particularly to physically deformable electronic devices.

Background Art

Mobile electronic communication devices, such as mobile telephones, smart phones, gaming devices, and the like, have become ubiquitous. These devices are used for a variety of purposes, including voice and video telecommunications, sending and receiving text and multimedia messages, Internet browsing, electronic commerce, and social networking. It would be advantageous to have improved control modes in an electronic device to adapt performance so as to make user interaction more efficient.

Figure 1:
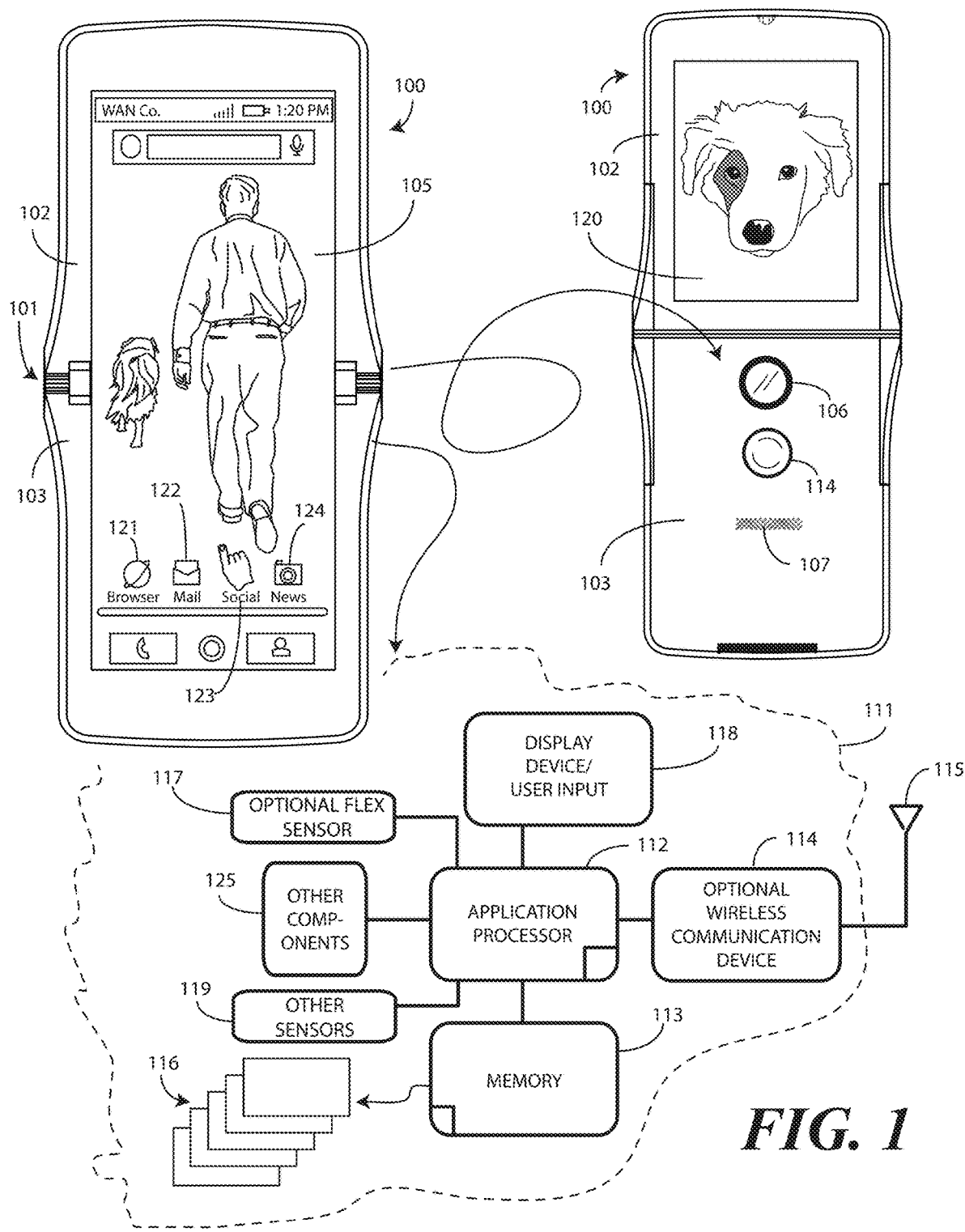
FIG. 1 illustrates one explanatory electronic device, along with an explanatory schematic block diagram, in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, in response to a bending operation transitioning a first device housing and a second device housing from a closed position to an axially displaced open position, presenting one or more interactive application portals on an interior display of an electronic device as a function of one or more notification messages present on an exterior display of the electronic device. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of performing control operations such as the launching and actuation of applications in response to user interaction with notifications and a corresponding rotation of a first device housing relative to a second device housing from a closed position to an axially displaced open position. The non-processor circuits may include, but are not limited to, imaging devices, microphones, loudspeakers, acoustic amplifiers, digital to analog converters, signal drivers, clock circuits, power source circuits, and user input devices. As such, these functions may be interpreted as steps of a method to perform control operations when a hinged electronic device is transitioned from a closed position to an axially displaced open position.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device having a flexible display, improve the functioning of the electronic device itself by facilitating the presentation of stereoscopic imagery and improving the overall user experience to overcome problems specifically arising in the realm of the technology associated with electronic device user interaction.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that electronic devices can provide "notifications" to a user on a display. These notifications, sometimes known as push notifications, are brief messages that are generated by or for applications operating on one or more processors of the electronic device. Illustrating by example, in a sports score application, the creator of the application can send a notification showing sports scores of teams of interest. Accordingly, rather than a user having to activate the electronic device, navigate to o the sports score application, search for the team of interest, and find the score, the user can simply allow the application to push notifications for a favored team. When the notification arrives, the user can simply glance at the display to obtain the information of interest without having to be actively using either the device or the sport score application.

In addition to presenting information of interest, notifications can perform other functions as well. For example, they can request user action. If a person misses an incoming telephone call, they may receive a notification from the voice communication application identifying the fact that the call was missed. The notification can include an interactive element, such as a "call back" user actuation target or a "listen to voicemail" user actuation target. By interacting with one of these interactive elements, the user can launch a corresponding application instantly, thereby bypassing the steps of having to manually navigate to the location. In other applications, such as where the notification indicates that a sale on a particular product is occurring, an interactive element may allow the user to instantly purchase the discounted product, and so forth.

Notifications differ from other cursory communications such as text messages or device alerts in that they have a corresponding application associated therewith. In the sports score application set forth above, the score notification is only received when the sports score application is installed in the electronic device. Similarly, in the product sale example, the sale notification is only received if a corresponding application is installed on the electronic device.

In some instances, notifications provide only cursory functions of the corresponding application. To obtain full functionality, the corresponding application would need to be accessed. Illustrating by example, for a social media application, a notification may indicate that a particular person has posted content. The notification may include interactive elements that provide limited functionality, such as, "view content" or "like content." Interacting with the former launches the social media application so that the content can be viewed. Interacting with the latter bypasses this step and allows the person to favorably review the content sight unseen. If the user wants to perform additional functions, however, such as sending the content creator a private or public message, they would need to open the social media application. Limited functionality of notifications keeps them simple in construct, with the assumption being that if functionality beyond that provided in a notification is required, the user will simply access the application instead.

Embodiments of the disclosure also contemplate that when many notifications are received, they can sometimes lose their useful features due to their quantity. For example, if a user has configured an electronic device to receive notifications from a sport score application, three or four social media applications, multiple shopping applications, navigation applications, financial applications, news applications, and so forth, the sheer number of applications can make finding those of most interest a daunting task. Embodiments of the disclosure contemplate that this is especially true in hinged electronic devices where an exterior display is smaller in size than the one—or multiple—displays on the interior of the device.

Even where a user can find a desired notification, prior art systems still suffer from deficiencies. In a hinged device, for example, where notifications are presented on an exterior display, to access the advanced features of the corresponding application as they relate to a particular notification, the user is required to select a particular notification, cause the corresponding application to actuate by interacting with an interactive element of the notification, open the electronic device, and interact with the application. If the user desires to interact with multiple notifications, this process must laboriously be repeated over and over and over.

Advantageously, to solve issues in managing notifications and corresponding applications, embodiments of the disclosure provide systems and methods for better notification/application management in hinged electronic devices where a first device housing and a second device housing can pivot about a hinge between a closed position and an axially displaced open position. It should be noted that while a hinged electronic device is used as an illustrative bending electronic device, the methods and systems described herein are equally applicable where the housing of an electronic device is simply flexible, but fails to include a hinge. For instance, where a device housing is manufactured from a malleable, bendable, or physically deformable material such as a flexible thermoplastic, flexible composite material, flexible fiber material, flexible metal, organic or inorganic textile or polymer material, or other materials, the methods and systems described herein can be used when the singular device housing deforms from a closed state to an axially displaced open state. Embodiments of the disclosure are also applicable to situations in which the device housing is a combination of rigid segments connected by hinges or flexible materials.

In one or more embodiments, upon a user interacting with a notification presented on a bendable electronic device when the electronic device is in a closed position and the notifications are presented on an exterior display, when the electronic device is transitioned to the open position one or more processors of the electronic device present one or more applications corresponding to the notifications with which the user has interacted. This automatic launch of the corresponding applications provides the user with an opportunity to interact with the applications corresponding to the notifications interacted with by the user to access additional functionality. The one or more processors thus migrate, from the notifications presented on the exterior display, to actionable interactive application portals presented on the interior display for each of those notifications with detailed information and actions in one or more embodiments.

In one or more embodiments, if the user has fully interacted with a particular notification such that the notification is dismissed, its corresponding application will not be automatically launched by the one or more processors when the electronic device is bent, folded, or pivoted from the closed position to the axially displaced open position. While the display area on the interior of such a deformable device is greater than that on the exterior, it is not unlimited. Thus, in one or more embodiments only applications corresponding to partially interacted with notifications will be presented on the interior display when the electronic device transitions from the closed position to the open position. Thus, in one or more embodiments the applications presented will correspond to notifications that the user has seen, optionally interacted with, but not yet dismissed, thereby ensuring that only the applications most likely to be used by the user are presented.

In one or more embodiments, a user accesses a notification presented on an exterior display of a bendable electronic device when the electronic device is in a closed position. Illustrating by example, the user may make a "swipe up" gesture or other gesture to "peek" at the notification to determine whether it is of interest. In some embodiments, when a "peek" gesture is performed, the gesture causes other notifications to be presented as well. Thus, in response to a user interaction with one or more notifications presented on the exterior display when the electronic device is in the closed position, the user sees, and optionally interacts with, one or more notification messages.

In one or more embodiments, when the electronic device is transitioned from the closed position to the axially displaced open position, one or more processors operating within the electronic device automatically actuates and launches applications corresponding to the notifications the user saw, and optionally interacted with, when the electronic device is in the open position. These applications may present an interactive application portal on the display. Continuing the sports score application example, the interactive application portal corresponding to the message seen by the user may be a portal displaying content directly related to the content of the notification, e.g., the box score of a baseball game for which the score was presented in the notification. Thus, the user instantly has access not only to the corresponding application, but a particular interactive application portal with which the user may access the increased functionality of the application for the information presented in the notification.

In one or more embodiments, one or more processors of the electronic device determine that there are multiple pending notifications available for presentation on the exterior display of a bendable electronic device when the bendable electronic device is in a closed position with a first portion of the electronic device and a second portion of the electronic device abutting. In one or more embodiments, the one or more processors further determine that the user is interacting with the exterior display while the notifications are available for presentation. This user interaction can cause the notifications to be displayed in one or more embodiments, as was the case in the using the "peek" gesture above. Alternatively, the user interaction can occur within a notification, such as actuating an interactive element presented within the notification, or scrolling through the notification to obtain additional information.

In one or more embodiments, when the bendable electronic device transitions from the closed position to the open position, the one or more processors determine whether any notifications have been partially interacted with by the user. The "partial" interaction is an interaction where the user has seen, and optionally interacted with, a notification, but not to an extent that the notification is dismissed.

Where there are such partially interacted notifications, in one or more embodiments the one or more processors actuate and open applications corresponding to the partially interacted notifications, presenting them on the interior display of the electronic device when it is in the open position. Where there are multiple applications corresponding to multiple notifications, the presented interactive application portals of these applications can be stacked, tiled, placed side-by-side, or arranged in another manner so as to make their presentation easily navigable and seamless. The user thus has the option of interacting with the interactive application portals to access additional functionality of the applications corresponding to the notifications. If, for some reason, the user fails to interact with a presented application while the electronic device is in the open position, in one or more embodiments the one or more processors can restore notifications corresponding to those unused applications, making them available for presentation again on the exterior display when the bendable electronic device returns to the closed position.

In one illustrative embodiment, the bendable electronic device is a hinged electronic device. Illustrating by example, in one embodiment an electronic device includes a first device housing and a second device housing. A hinge couples the first device housing to the second device housing such that the first device housing is pivotable about the hinge relative to the electronic device between a closed position and an axially disposed open position.

In one embodiment, a display is coupled to one of the first device housing or the second device housing. The display, referred to as an "exterior display," is exposed when the first device housing and the second device housing are in the closed position. However, at least one other display is coupled to the first device housing and/or the second device housing. This other display, referred to as an "interior display," is concealed when the first device housing and the second device housing are in the closed position.

In one or more embodiments, one or more processors operable with the display and the other display detect user input interacting with at least one user actuation target, associated with a predefined application operating on the one or more processors and present on the display, when the first device housing and the second device housing are in the closed position. In one or more embodiments, upon detecting the first device housing pivoting relative to the second device housing from the closed position to the axially displaced open position, the one or more processors present an interactive application portal of the predefined application on the at least one other display. This process will be explained in greater detail below with reference to FIGS. 7-12.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device 100 to allow it to be folded in multiple locations.

While the illustrative electronic device 100 of FIG. 1 includes a hinge 103, embodiments of the disclosure are not so limited. In other embodiments, the electronic device 100 will be bendable, but will not include a hinge 103. In still other embodiments, the electronic device 100 can be bendable via a combination of hinge components and non-hinge components.

Illustrating by example, in another embodiment the electronic device 100 of FIG. 1 includes a single housing. In one or more embodiments, that housing is flexible. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

The illustrative electronic device 100 of FIG. 1 includes multiple displays 105,120. A first display 120, which can be coupled to either of the first device housing 102 or the second device housing 103, is coupled to the first device housing 102 in this embodiment. This display 120 is considered to be an "exterior" display due to the fact that it is exposed when the first device housing 102 and the second device housing 103 are in the closed position, as will be described below with reference to FIG. 2.

The other display 105 can also be coupled to either or both of the first device housing 102 or the second device housing 103. In this illustrative embodiment, the other display 105 is coupled to both the first device housing 102 and the second device housing 103 and spans the hinge 101. In other embodiments, as will be described below with reference to FIG. 6, the other display can be two displays, with one coupled to the first device housing 102 and another coupled to the second device housing 103. In either case, this display 105 is considered to be an "interior" display because it is concealed when the first device housing 102 and the second device housing 103 are in the closed position, as will also be described below with reference to FIG. 2.

In one or more embodiments, either or both of display 105 or display 120 can be touch-sensitive. Where this is the case, users can deliver user input to one or both of display 105 or display 120 by delivering touch input from a finger, stylus, or other objects disposed proximately with the display 105 or display 120.

In the illustrative embodiment of FIG. 1, since display 105 spans the hinge 101, it is configured to be flexible. For instance, in one embodiment display 105 is configured as an organic light emitting diode (OLED) display fabricated on a flexible plastic substrate. This allows the display 105 to be flexible so as to deform when the first device housing 102 pivots about the hinge 101 relative to the second device housing 103. However, it should be noted that other types of displays would be obvious to those of ordinary skill in the art having the benefit of this disclosure. As will be described below with reference to FIG. 6, in other embodiments conventional, rigid displays can be disposed to either side of the hinge rather than using a flexible display.

In one or more embodiments, display 105 is configured as an OLED constructed on flexible plastic substrates to allow the display 105 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 105 may be formed from multiple layers of flexible material such as flexible sheets of polymer or other materials.

In this illustrative embodiment, the display 105 is coupled to the first device housing 102 and the second device housing 103. Accordingly, the display 105 spans the hinge 101 in this embodiment. In one or more embodiments, the display 105 can instead be coupled to one, or two, spring-loaded, slidable trays that situate within one or both of the first device housing 102 and the second device housing 103. The use of one or two slidable trays advantageously allows the display 105 to be placed in tension when the electronic device 100 is in the open position. This causes the display 105 to be flat, rather than wavy due to mechanical memory effects, when the electronic device 100 is in the open position.

Features can be incorporated into the first device housing 102 and/or the second device housing 103. Examples of such features include an optional camera 106 or an optional speaker port 107, which are shown disposed on the rear side of the electronic device 100 in this embodiment, but could be placed on the front side as well. In this illustrative embodiment, a user interface component 108, which may be a button or touch sensitive surface, can also be disposed along the rear side of the second device housing 103. As noted, any of these features are shown being disposed on the rear side of the electronic device 100 in this embodiment, but could be located elsewhere, such as on the front side or minor sides in other embodiments.

A block diagram schematic 111 of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 114 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100.

The application layer can be responsible for executing application service modules. The application service modules may support one or more applications or "apps." Examples of applications shown in FIG. 1 include an Internet browser application 121, an electronic mail application 122, a social media application 123, and a news application 124. These applications are illustrative only, as numerous others will be obvious to those of ordinary skill in the art having the benefit of this disclosure. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
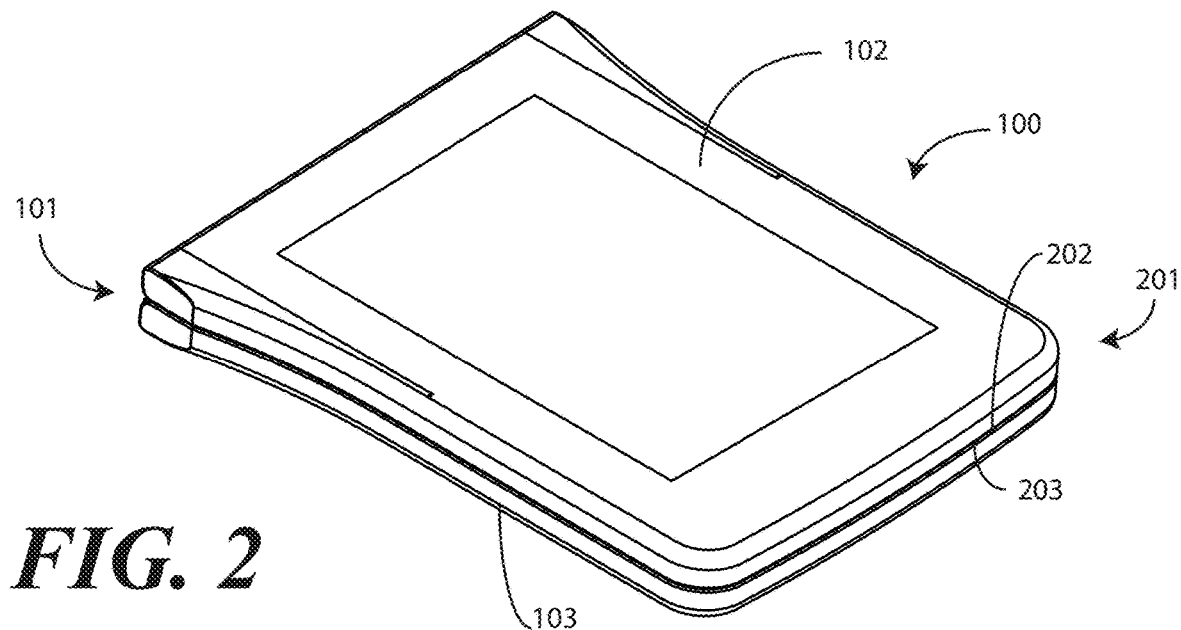
FIG. 2 illustrates one explanatory electronic device with a first device housing and a second device housing pivoted to a closed position in accordance with one or more embodiments of the disclosure.
Figure 3:
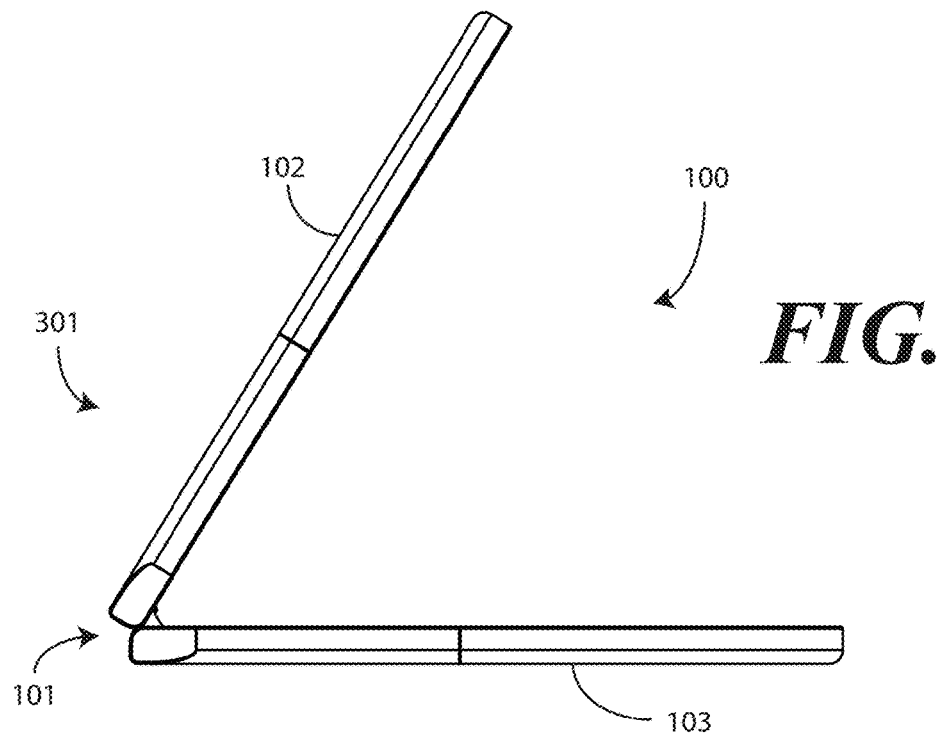
FIG. 3 illustrates one explanatory electronic device with a first device housing and a second device housing pivoted to a partially open position in accordance with one or more embodiments of the disclosure.

In one embodiment, the electronic device 100 includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the flex sensors 117 comprise passive resistive devices manufactured from a material with an impedance that changes when the material is bent, deformed, or flexed. By detecting changes in the impedance as a function of resistance, the one or more processors 112 can use the one or more flex sensors 117 to detect bending of the first device housing 102 about the hinge 101 relative to the second device housing 103. In one or more embodiments, each flex sensor 117 comprises a bi-directional flex sensor that can detect flexing or bending in two directions. In one embodiment, the one or more flex sensors 117 have an impedance that increases in an amount that is proportional with the amount it is deformed or bent.

In one embodiment, each flex sensor 117 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 117 bends, the impedance of the resistive layer changes, thereby altering the flow of current for a given voltage. The one or more processors 112 can detect this change to determine an amount of bending. Taps can be added along each flex sensor 117 to determine other information, including the amount of bending, the direction of bending, and so forth. The flex sensor 117 can further be driven by time-varying signals to increase the amount of information obtained from the flex sensor 117 as well. While a multi-layered device as a flex sensor 117 is one configuration suitable for detecting at least a bending operation occurring to deform the electronic device 100 and a geometry of the electronic device 100 after the bending operation, others can be used as well. Other types of flex sensors 117 will be obvious to those of ordinary skill in the art having the benefit of this disclosure.

In one embodiment, the one or more processors 112 may generate commands or execute control operations based on information received from the various sensors, including the one or more flex sensors 117, the user interface 118, which includes display 105 and display 120, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 125 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge 191 toward the second device housing 103 to a closed position 201. When in the closed position 201, a front surface 202 of the first device housing 102 abuts a front surface 203 of the second device housing 103. When in the closed position 201, the exterior display, i.e., display 120, is visible, exposed, and accessible by a user. By contrast, when in the closed position 201, the interior display, i.e., display (105), is concealed, is not visible, and is inaccessible by a user. Effectively, in the closed position 201 the first device housing 102 and the second device housing 103 are analogous to clam shells that have been shut by the claim, thereby giving rise to the "clamshell" style of device.

Turning now to FIG. 3, the electronic device 100 is shown being transitioned from the closed position (201) of FIG. 2 to a partially opened position. Specifically, the first device housing 102 is pivoting about the hinge 101 away from the second device housing 103 toward, but not fully yet to, an open position where the first device housing 102 is axially displaced about the hinge 101 from the second device housing 103. The position shown in FIG. 3 can be referred to as a "tent position" 301.

Figure 4:
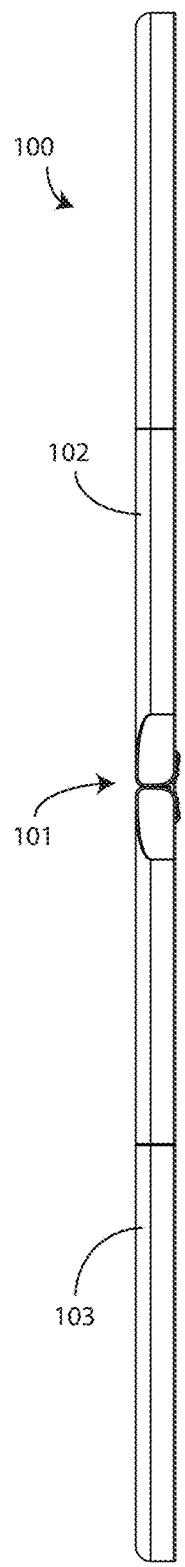
FIG. 4 illustrates one explanatory electronic device with a first device housing and a second device housing pivoted to an axially displaced open position in accordance with one or more embodiments of the disclosure.
Figure 5:
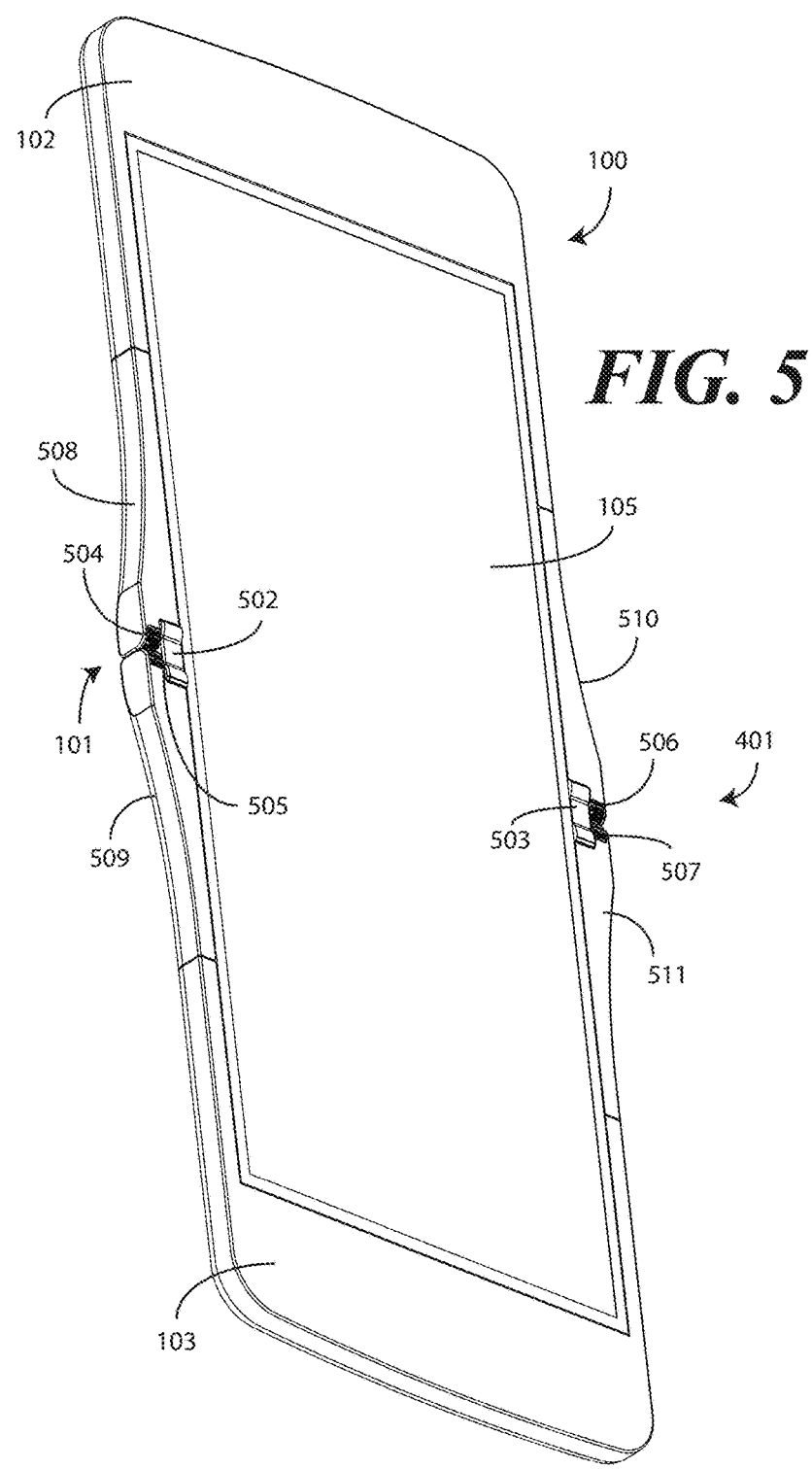
FIG. 5 illustrates another view of one explanatory electronic device with a first device housing and a second device housing pivoted to an axially displaced open position in accordance with one or more embodiments of the disclosure.

Turning now to FIGS. 4 and 5, illustrated therein is the electronic device 100 in an open position 401 where the first device housing 102 is rotated about the hinge 101 so as to become axially displaced from the second device housing 103. In the open position, the first device housing 102 is rotated about the hinge 101 180-degrees out of phase with the second device housing 103 such that the first device housing 102 and the second device housing 103 effectively define a plane. The display 105 has been elongated into a flat position. In one or more embodiments this occurs due to the action of one or more slidable trays (mentioned above), which can be disposed within one or both of the first device housing 102 and the second device housing 103.

Figure 6:
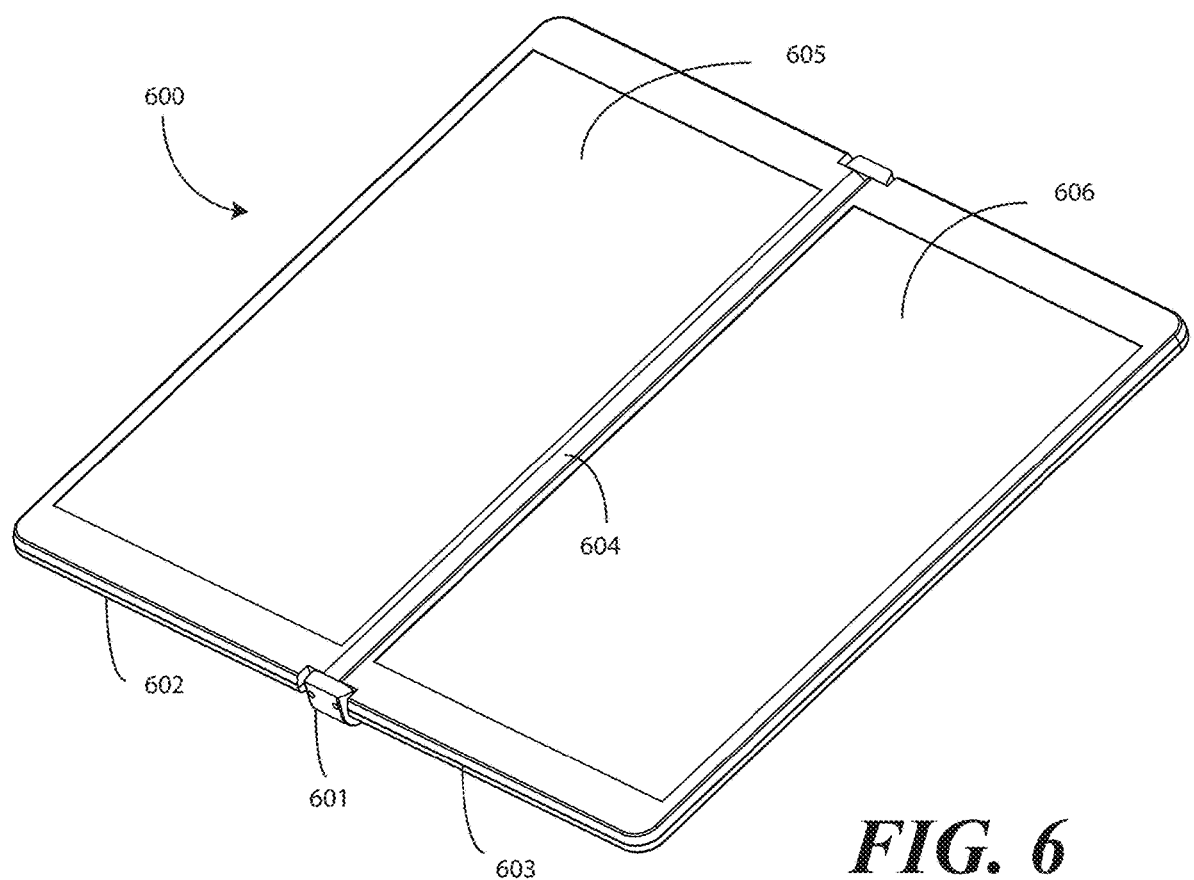
FIG. 6 illustrates another explanatory electronic device with a first device housing and a second device housing pivoted to an axially displaced open position in accordance with one or more embodiments of the disclosure.

Turning now to FIG. 6, illustrated therein is another electronic device 600 configured in accordance with one or more embodiments of the disclosure. The electronic device 600 of FIG. 6 is similar to that of FIG. 1, in that it includes a first device housing 602 and a second device housing 603, and a hinge 601. The hinge 601 couples the first device housing 602 to the second device housing 603. The first device housing 602 is pivotable about the hinge 601 relative to the second device housing 603 between an axially displaced open position and a closed position, as previously described.

In one or more embodiments, the electronic device 600 also includes an exterior display attached to one of the first device housing 602 or the second device housing 603, as previously described above with reference to display (120) of FIG. 1. However, rather than having a flexible display, in this embodiment the electronic device 600 includes a first display 605 coupled to the first device housing 602 and a second display 606 coupled to the second device housing 603. Thus, in addition to separating the first device housing 602 from the second device housing 603, the hinge 601 separates the first display 605 from the second display 606 as well.

Figure 7:
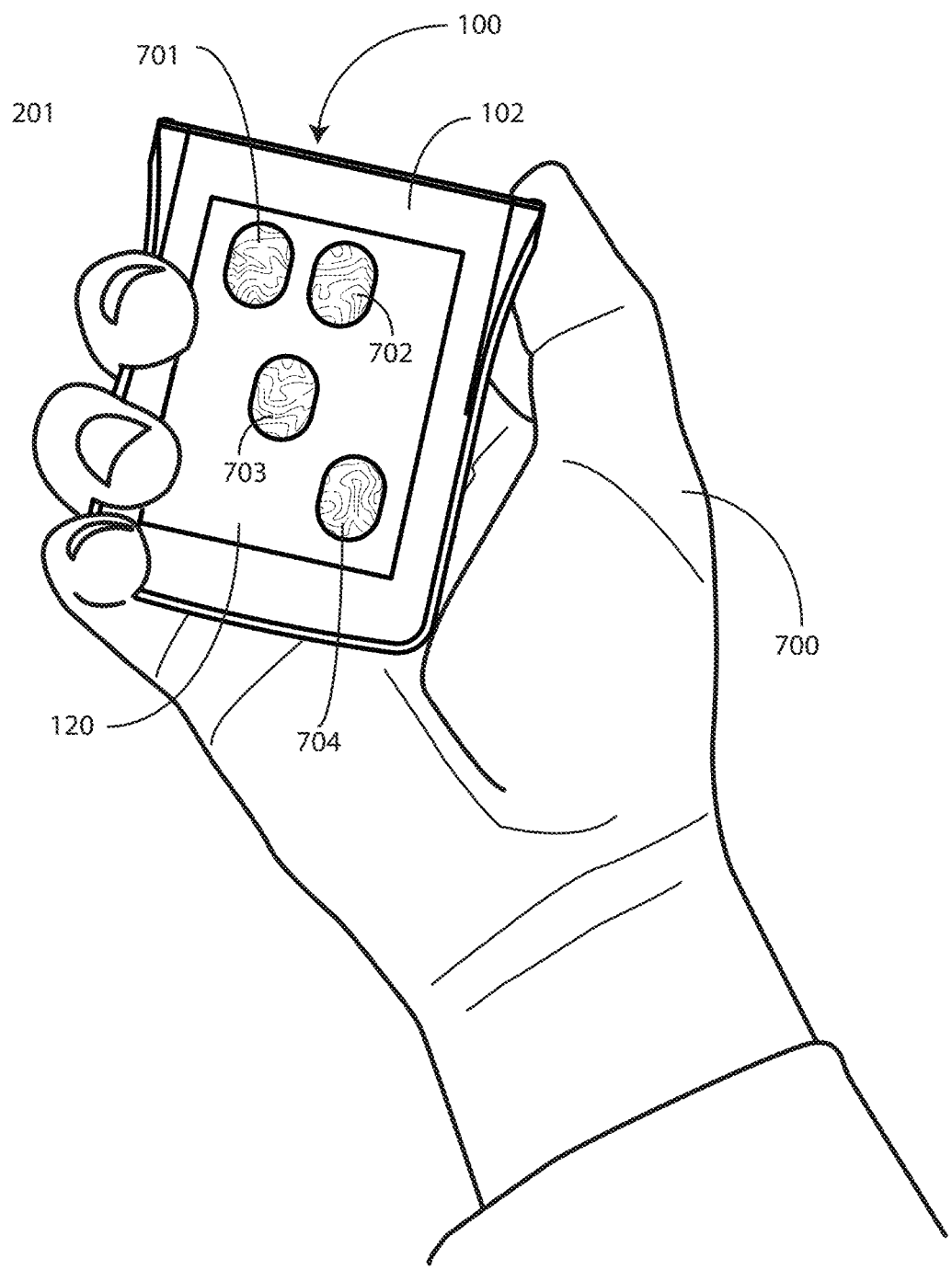
FIG. 7 illustrates one explanatory electronic device and one or more method steps in accordance with one or more embodiments of the disclosure.

Turning now to FIG. 7, illustrated therein is a user 700 holding the electronic device 100 of FIG. 1 while the electronic device 100 is in the closed position 201. Display 120, which is disposed on the exterior side of the first device housing 102 is exposed and visible. By contrast, display (105) is concealed when the electronic device 100 is in the closed position 201 due to the fact that the interior surfaces of the first device housing 102 and the second device housing (103), along which display (105) is disposed, abut when the electronic device 100 is in the closed position 201.

As shown in FIG. 7, the one or more processors (112) of the electronic device 100 present one or more user actuation targets 701,702,703,704 display 120. In this illustration, the one or more user actuation targets 701,702,703,704 are each associated with a corresponding predefined application, e.g., applications (121,122,123,124). In this illustration, the one or more user actuation targets 701,702,703,704 comprise two or more user actuation targets (here four) associated with two or more predefined applications (again, here four). The number of user actuation targets and corresponding applications can be one, two, three, four, or more in various embodiments.

The user actuation targets 701,702,703,704 are "targets" because they represent visual objects that, when placed upon a touch-sensitive display such as display 120, can be actuated when the user 700 interacts with the user actuation targets 701,702,703,704 by touching, moving, sliding, expanding, or otherwise interacting with them with a finger, stylus, or other object placed atop the user actuation targets 701,702,703,704 along the display 120.

In one or more embodiments, these user actuation targets 701,702,703,704, which can be configured graphically as images, words, shapes, or other objects, indicate that one or more notifications have been received in one or more embodiments. For example, recall from above that in one embodiment the electronic device 100 had an Internet browser application (121), an electronic mail application (122), a social media application (123), and a news application (124) operating on the one or more processors (112). In one or more embodiments, the user 700 can employ a control panel within these applications, or alternatively globally within the electronic device 100, to allow the applications to receive one or more notifications.

Illustrating by example, when new electronic mail correspondence is received, the electronic mail application (122) may cause a user actuation target 701 shaped like an envelope to appear on the display 120. Similarly, when a friend posts new content, the social media application (123) may cause a user actuation target 702 that is shaped like a picture to be presented on the display 120, and so forth. These examples are illustrative only, as numerous other user actuation targets and corresponding applications will be obvious to those of ordinary skill in the art having the benefit of this disclosure.

Figure 8:
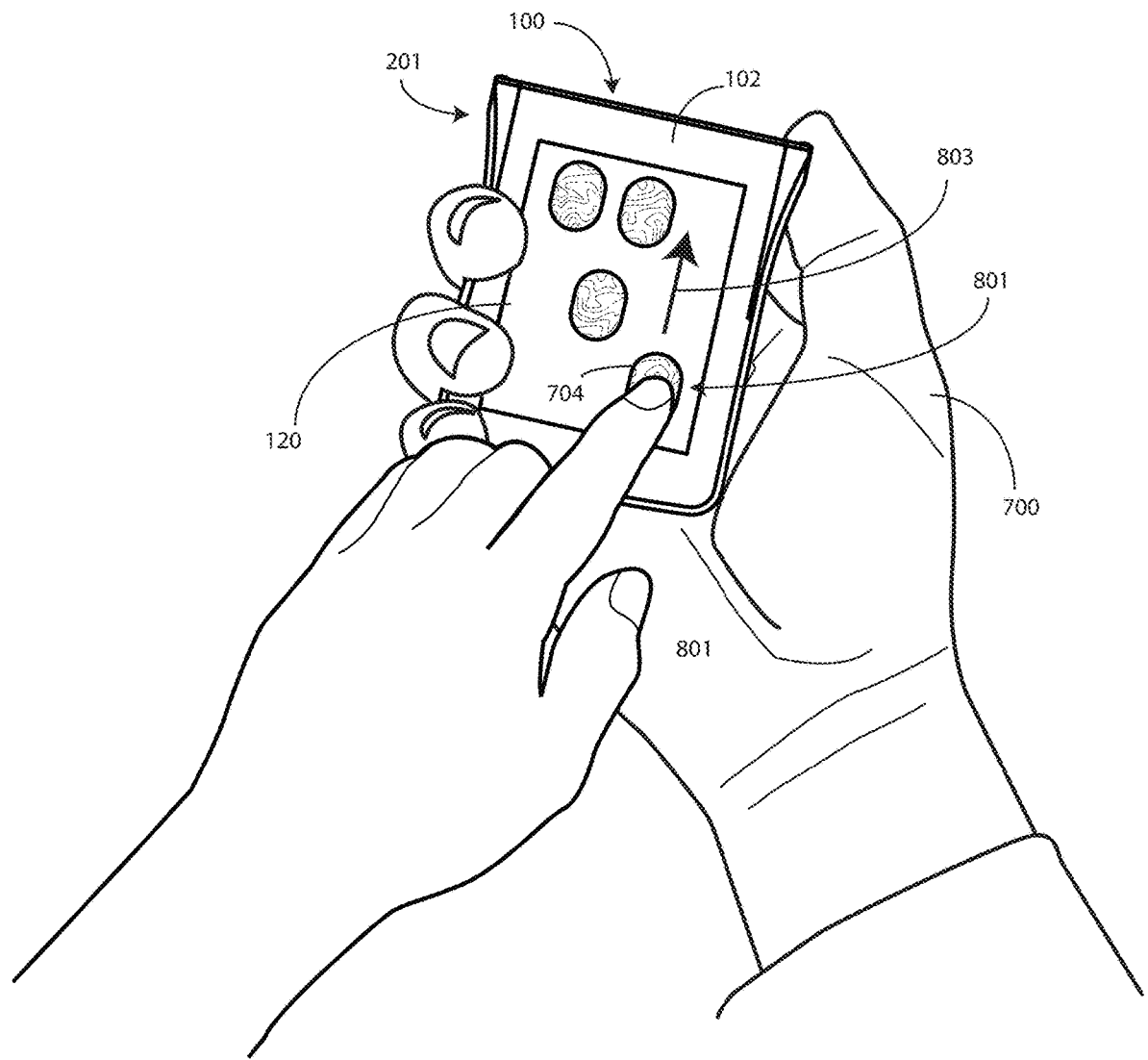
FIG. 8 illustrates one explanatory electronic device and one or more method steps in accordance with one or more embodiments of the disclosure.

Turning now to FIG. 8, the user 700 is interacting 801 with one of the user actuation targets 704 with a finger 802. The user interaction 801 with the user actuation target 704 can take various forms. In one embodiment, the user interaction 801 with the user actuation target 704 comprises the user 700 touching the display 120 at the user actuation target 704 with the finger 802. In another embodiment, the user interaction 801 with the user actuation target 704 comprises the user 700 touching and holding the finger 802 on the display 120 at the user actuation target 704 for a predefined amount of time. In another embodiment, the user interaction 801 with the user actuation target 704 comprises the user 700 touching the display 120 with the finger 802 at the user actuation target 704 and making a gesture 803, such as a swiping motion. These examples of user interaction 801 with the user actuation target 704 are illustrative only, as numerous others will be obvious to those of ordinary skill in the art having the benefit of this disclosure.

In one or more embodiments, different user interaction 801 with the user actuation target 704 can cause different operations to occur. For example, in one embodiment a first user interaction with the user actuation target 704 causes a first control operation to occur, while a second user interaction with the user actuation target 704 causes a second control operation to occur, and so forth. Using a notification as an illustrative example, in one embodiment presentation of the user actuation target 704 on the display 120 indicates that a notification has been received from a corresponding application, or alternatively has been generated by the corresponding application. In one or more embodiments, the shape or visual appearance of the user actuation target 704 identifies the corresponding application from which the notification was received.

In one or more embodiments, a first user interaction 801 with the user actuation target 704 causes a first control operation to occur. For example, the user 700 can touch the display 120 with the finger 802 and hold the finger 802 there for a predetermined amount of time to see a first subset of the content included with the notification. This allows the user 700 to see a brief amount of content to determine whether further inquiry into the content of the notification is warranted.

Thereafter, where further inquiry into the notification is warranted, a second user interaction with the user actuation target 704 can cause a second control operation to occur. Illustrating by example, in one or more embodiments the user 700 can interact 801 with the user actuation target 704, such as by making a gesture 803, that causes the notification represented by the user actuation target 704 to expand, thereby revealing additional notification information. In one embodiment, the second user interaction is that of making the gesture 803 with the finger to "swipe" up so as to see the full notification content, and optionally one or more interactive elements included with the notification.

In one or more embodiments, the one or more processors (112) of the electronic device 100, which are operable with both display 120 and display (105), detecting this user input interacting with the user actuation target 704 while the user actuation target 704 is present on the display 120, and when the first device housing 102 and the second device housing (103) are in the closed position 201. As noted above, in one or more embodiments the user actuation target 704 is associated with a predefined application operating on the one or more processors 112. In this example, the user actuation target 704 is associated with an electronic mail application (122) and indicates that a new electronic communication has been received.

Figure 9:
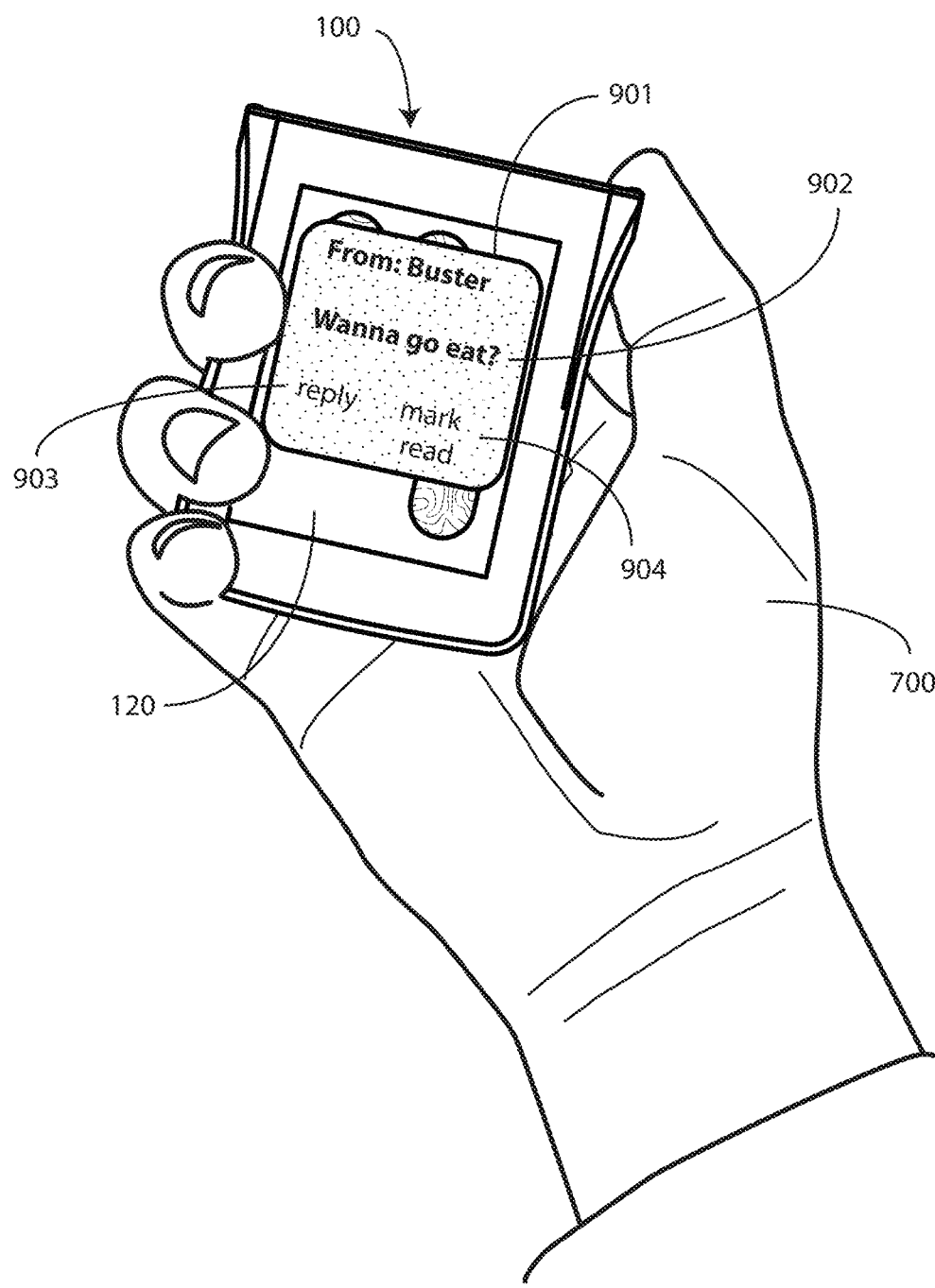
FIG. 9 illustrates one explanatory electronic device and one or more method steps in accordance with one or more embodiments of the disclosure.

Turning now to FIG. 9, illustrated therein is an example of a result of these two user interactions. As shown in FIG. 9, after touching the user actuation target (704) to "peek" at a subset of the notification content, and then making the gesture (803), the full notification 901 appears on the display 120. This has caused the notification 901 represented by the user actuation target (704) to expand, thereby revealing additional notification information.

In one or more embodiments, the notification 901 will include content 902. In one embodiment, the content 902 will comprise the additional notification information that becomes viewable when the notification 901 represented by the user actuation target (704) expands. The content 902 could be text content, picture content, multimedia content, or other content. Frequently, to conserve processing power and to make the presentation of the notification 901 more efficient, the content 902 will only be text content. However, embodiments of the disclosure are not so limited, and the notification 901 could include other types of content as well.

In one or more embodiments, the notification 901 will also include at least one interactive element. In this illustration, the notification 901 comprises a first interactive element 903 and a second interactive element 904. The interactive elements are objects with which the user 700 may interact to perform control operations.

In this illustration, the notification 901 indicates that an electronic message has been received by the application associated with the notification, which is the electronic mail application (122). The content 902 indicates that the message was received from the user's best friend, Buster, and includes an invitation for the user 700 and Buster to share a meal together.

To provide for quick action and response without having to open the electronic device 100, the first interactive element 903 and the second interactive element 904 provide control operation tools with which the user 700 can take immediate action on the notification 901. In this example, the first interactive element 903 comprises a user actuation target that is the word "reply." This is an action interactive element, as interacting with it causes an action to occur in response to the receipt of the notification 901. In this illustration, interacting with the first interactive element 903 might cause a preformatted reply message or other message to be sent back to Buster. An example of a preformatted reply message might be "that sounds absolutely wonderful." Other examples of preformatted reply messages will be obvious to those of ordinary skill in the art having the benefit of this disclosure. Moreover, other response actions that can occur in response to user interaction with the first interactive element 903 will be obvious to those of ordinary skill in the art as well.

In this example, the second interactive element 904 is another user actuation target configured as the words "mark read." This is a dismissal interactive element, as interacting with it causes the notification 901 to be dismissed so as not to appear on the display 120 again. Accordingly, when the user 700 wishes not to take action in response to receiving the notification 901, but instead wants to dismiss the notification 901 without taking action, the user 700 can simply interact with the second interactive element 904 by touching it.

It should be noted that in one or more embodiments the first interactive element 903 is configured as a combination action/dismissal interactive element. Embodiments of the disclosure contemplate that the user 700 may not wish to see the notification 901 again after replying to it. Accordingly, in one or more embodiments interacting with the first interactive element 903 causes not only an action to occur in response to receiving the notification 901, but for the notification 901 to be dismissed as well.

Embodiments of the disclosure contemplate that in some instances the user 700 may receive many notifications. Recall from above that in FIG. 7, there were four user actuation targets (701,702,703,704) presented on the display 120, indicating that at least four notifications had been received. It is possible for the electronic device 100, when properly configured, to receive tens, hundreds, or even more notifications before the user 700 begins to view, act, dismiss, or otherwise interact with the notifications.

Embodiments of the disclosure also contemplate that the area of display 120 in which the notification 901, its content 902, and optionally its interactive elements 903,904 can be small. Accordingly, in one or more embodiments the notification 901 are presented on the display 120 one at a time.

Figure 10:
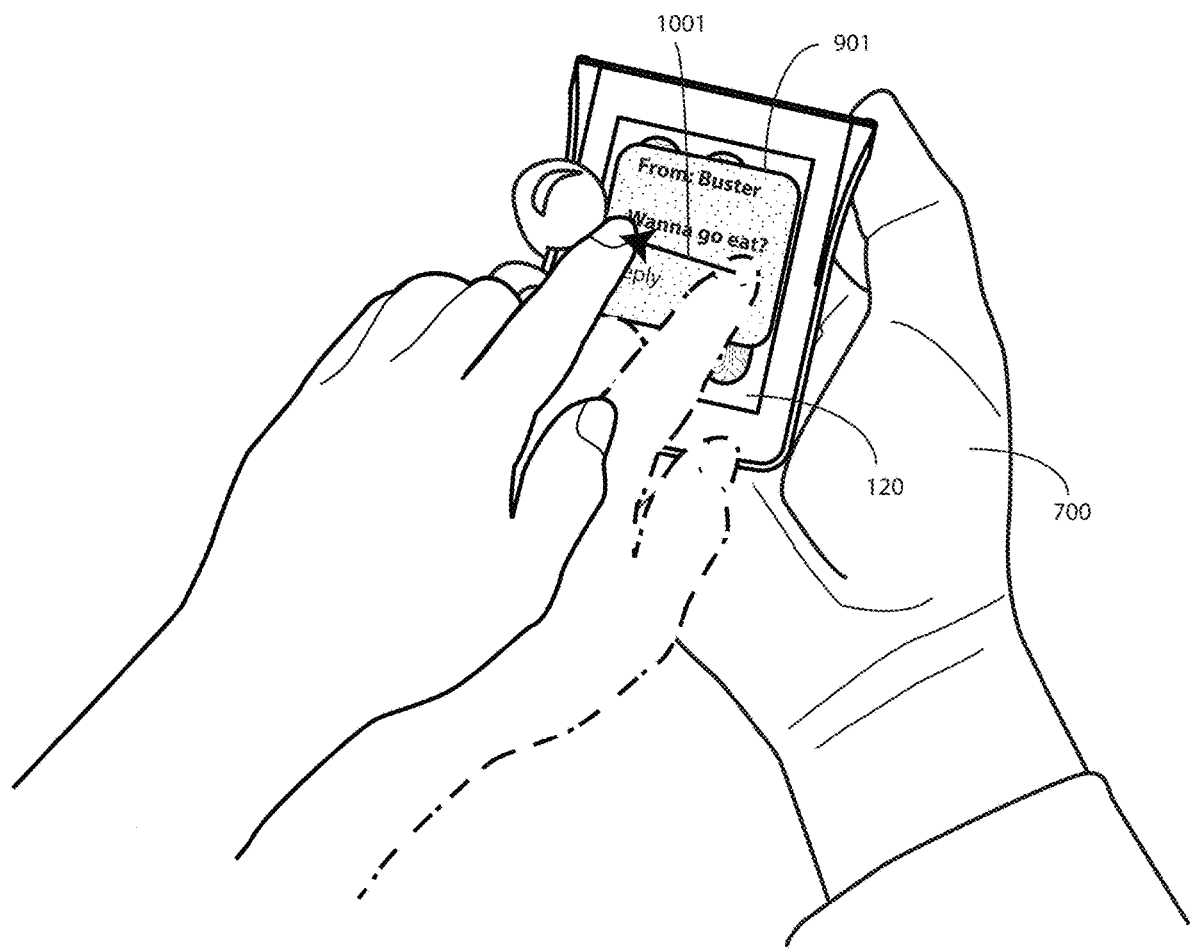
FIG. 10 illustrates one explanatory electronic device and one or more method steps in accordance with one or more embodiments of the disclosure.

Turning now to FIG. 10, in one or more embodiments the user 700 can navigate between notifications 901 by interacting with them. In this illustration, the user 700 makes a swipe gesture 1001 to move one notification 901 off the display 120 so that another can be presented. It should be noted that in one or more embodiments moving a notification 901 off the display 120 without either acting in response to receiving it, or alternatively dismissing it, may cause the notification 901 to remain available for presentation on the display 120. Accordingly, should the user 700 desire not to see the notification 901 again, it should be dismissed in one embodiment rather than moved off the display 120.

Figure 11:
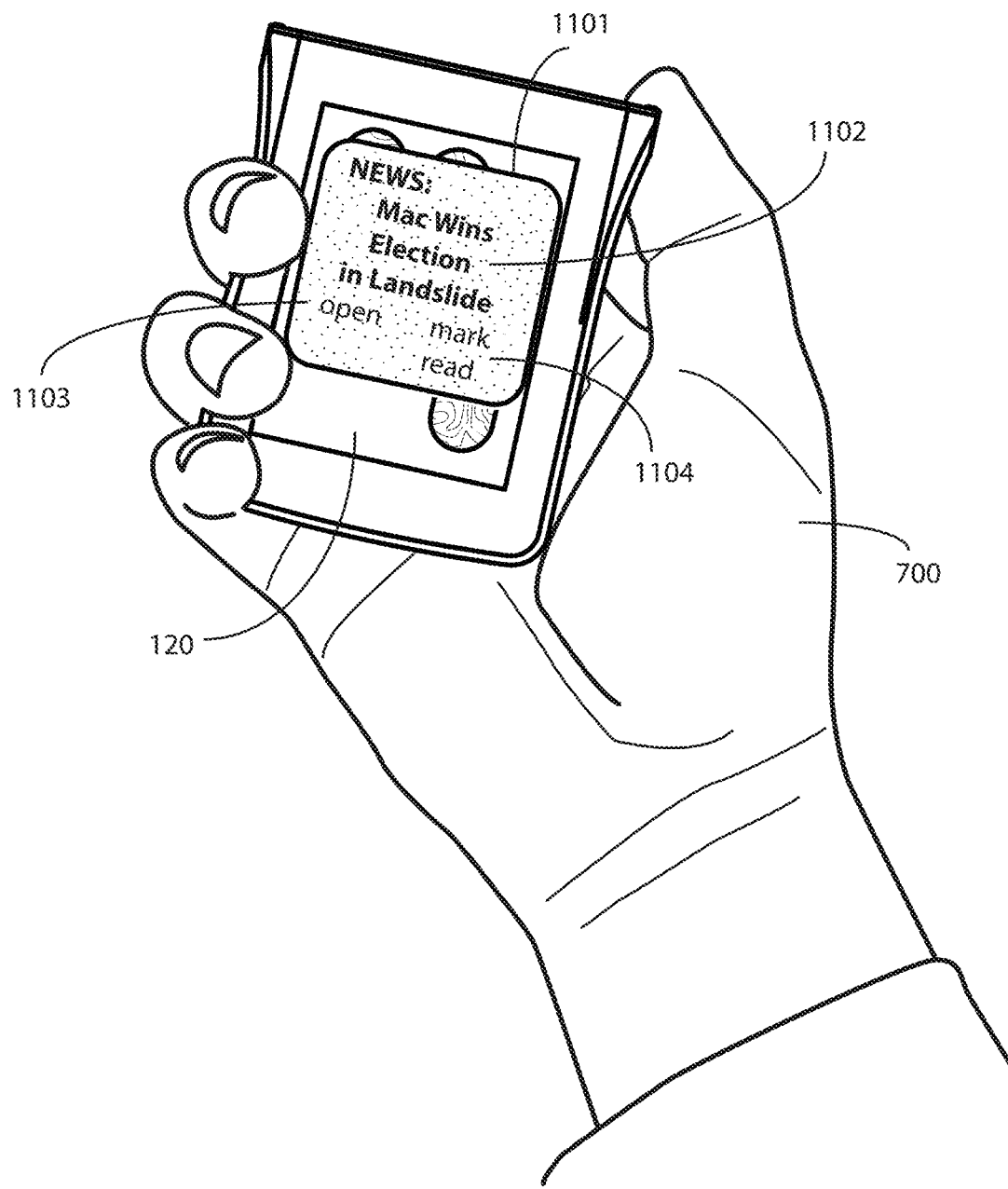
FIG. 11 illustrates one explanatory electronic device and one or more method steps in accordance with one or more embodiments of the disclosure.

One example of a result of the swipe gesture 1001 is shown in FIG. 11. Turning now to FIG. 11, the first notification (901) with which the user 700 interacted is gone, and a second notification 1101 is present on the display 120. In this illustration, rather than being associated with an electronic mail application (122), the notification 1101 is a news notification associated with a news application (124).

As before, the notification 1101 includes content 1102. Since this is a news notification, the content 1102 is an election result setting forth the headline, "Mac wins Election in Landslide." Also as before, the notification 1101 includes a first interactive element 1103 and a second interactive element 1104.

To provide for quick action and response without having to open the electronic device 100, the first interactive element 1103 comprises a user actuation target that is the word "read." This is an action interactive element, as interacting with it causes an action to occur in response to the receipt of the notification 1101. In this illustration, interacting with the first interactive element 1103 might cause portions of the full news article to be presented on the display 120.

In this example, the second interactive element 1104 is another user actuation target configured as the words "mark read." This is a dismissal interactive element, as interacting with it causes the notification 1101 to be dismissed so as not to appear on the display 120 again. Accordingly, when the user 700 wishes not to take action in response to receiving the notification 1101, but instead wants to dismiss the notification 1101 without taking action, the user 700 can simply interact with the second interactive element 1104 by touching it.

Thus, as shown in FIGS. 8-10, in one or more embodiments a user 700 accesses a notification 901,1101 presented on an exterior display 120 of an electronic device 100 when the electronic device 100 is in a closed position 201. As shown in FIG. 8, the user 700 can touch a user actuation element 704 to peek at a subset of the content 902 to determine whether it is of interest. In one or more embodiments, the user 700 may make a gesture 803, such as a "swipe up" gesture or other gesture, to cause the notification 901 to be presented. The user 700 can navigate between notifications 901,1101 in one or more embodiments by making other gestures 1001, such as swiping to the left or right. Thus, in response to a user interaction with one or more user actuation targets 704 and/or notifications 901, 1101 presented on the exterior display 120 when the electronic device 100 is in the closed position 201, e.g., user interaction 801 (which can also be the user interaction acting with an interactive element 903,904,1103,1104 to act in response to and/or dismiss the notification 901,1101), the user 700 sees, and optionally interacts with, one or more notification messages.

In one or more embodiments, the one or more processors (112) of the electronic device 100 detect and monitor this user interaction 801 with the one or more user actuation targets 701,702,703,704 and/or the one or more notifications 901,1101 presented on the exterior display 120 when the electronic device 100 is in the closed position 201. Said differently, in one or more embodiments the one or more processors (112) detect user input interacting with at least one user actuation target 701,702,703,704 associated with a predefined application (121,122,123,124) operating on the one or more processors (112), and present on the display 120, when the first device housing 102 and the second device housing (103) are in the closed position 201.

In one or more embodiments, to more efficiently make the predefined applications (121,124) associated with the notifications 901,1101 with which the user 700 has interacted available when the electronic device 100 is opened, upon detecting the first device housing 102 pivoting relative to the second device housing (103) from the closed position 201 to the axially displaced open position (401), the one or more processors (112) present an interactive application portal of the corresponding predefined application on the at least one other display. This is shown in FIG. 12.

Figure 12:
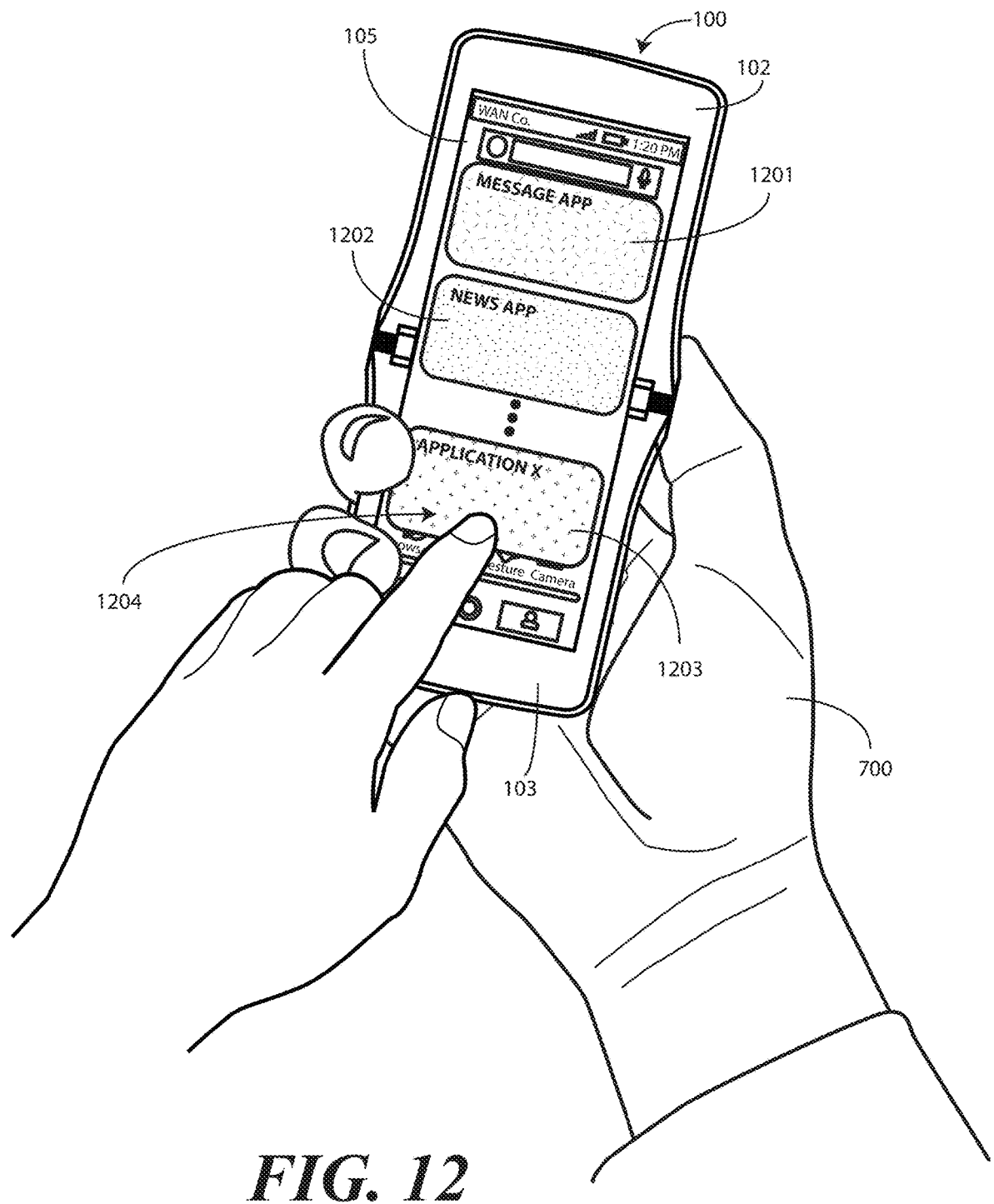
FIG. 12 illustrates one explanatory electronic device and one or more method steps in accordance with one or more embodiments of the disclosure.

Turning now to FIG. 12, upon detecting the first device housing 102 pivoting relative to the second device housing 103 from the closed position (201) to the axially displaced open position 401, the one or more processors (112) present an interactive application portal of the corresponding predefined application on the interior display. In this illustration, the one or more processors (112) are presenting two or more interactive application portals 1201,1202,1203, which correspond to two or more predefined applications, on the interior display 105 upon detecting the first device housing 102 pivoting relative to the second device housing 103 from the closed position (201) to the axially displaced open position 401.

Continuing the example from FIGS. 9-11, in which the user 700 interacted with, but did not dismiss, a notification (901) from the corresponding electronic mail application (122) and another notification (1101) from the corresponding news application (124), the one or more processors (112) present an interactive application portal 1201 of the electronic mail application (122) and another interactive application portal 1202 of the news application (124) on the interior display 105. A third interactive application portal 1203 is shown to illustrated that a plurality of interactive application portals can be presented on the interior display 105 as a function of which notifications the user 700 has interacted with without dismissing.

In one or more embodiments, these interactive application portals 1201,1202,1203 comprise interactive computing environments through which features of the corresponding applications (121,122,123,124), which are not available in the notifications (901,1101) received or generated by the corresponding applications (121,122,123,124), are available to a user. Using the electronic mail application (122) as an illustrative example, an additional function accessible through the interactive application portal 1201 may be the ability to format text, attach images or videos, copy other recipients, blind copy other recipients, and so forth. These features are illustrative only, as other additional features will be available in other interactive application portals of other applications. Still other additional features will be obvious to those of ordinary skill in the art having the benefit of this disclosure.

In one or more embodiments, the one or more processors (112) present the interactive application portals 1201,1202 of the corresponding applications (121,124) on the interior display 105 only when the at least one user actuation target associated therewith is present on the exterior display (120) when the first device housing 102 pivots relative to the second device housing 103 from the closed position (201) to the axially displaced open position 401. Illustrating by example, in the illustrative embodiment of FIG. 7, four user actuation targets (701,702,703,704) were present on the exterior display (120). Accordingly, in one or more embodiments the one or more processors (112) would present at most four interactive application portals on the interior display 105 when the first device housing 102 pivots relative to the second device housing 103 from the closed position (201) to the axially displaced open position 401. Embodiments of the disclosure contemplate that some user actuation targets will have associated therewith a time limit. For example, a news notification may no longer be timely. Thus, in one embodiment where a notification or user actuation target has expired, its corresponding interactive application portal will not be presented on the interior display 105 when the first device housing 102 pivots relative to the second device housing 103 from the closed position (201) to the axially displaced open position 401.

Embodiments of the disclosure also contemplate that, in one or more embodiments, interactive application portals of applications corresponding to notifications that have been dismissed by a user should not be presented on the interior display 105 when the first device housing 102 pivots relative to the second device housing 103 from the closed position (201) to the axially displaced open position 401. Recall from above that in one or more embodiments the notifications (901,1101) each included interactive elements (904,1104) dismissing the notification (901,1101) in response to an interaction event, e.g., the user 700 providing user input or user interactions, occurring at the interactive elements (904, 1104). In one or more embodiments, the one or more processors (112) preclude presenting interactive application portals of applications corresponding to notifications dismissed by the interaction event occurring at the at least one interactive element.

In one or more embodiments, the one or more processors (112) of the electronic device 100 can monitor the interactive application portals 1201,1202,1203 to perform control operations, generate data structures, control access to one or more functions of the corresponding applications (121,122, 123,124), and so forth. Illustrating by example, if the interactive application portal 1203 corresponds to a social media application (123), and the user 700 interacts 1204 with the interactive application portal 1203 to take an action in response to receiving a notification of the social media application (123), the one or more processors (112) detect the user input interacting 124 with the interactive application portal 1203. Embodiments of the disclosure contemplate that the user 700 will not want to see the notification promoting this action again. Accordingly, in one or more embodiments the one or more processors (112) dismiss notifications associated with interactive application portals 1203 with which the user has interacted.

By contrast, despite the fact that the one or more interactive application portals 1201,1202,1203 are presented on the interior display 105 when the first device housing 102 pivots relative to the second device housing 103 from the closed position (201) to the axially displaced open position 401, the user 700 may not interact with them at all. Accordingly, in one or more embodiments the one or more processors (112) further preserve other notifications associated with other interactive application portals for presentation on the exterior display (120) when the electronic device 100 returns to the closed position (201) upon failing to detect user input interacting with the other interactive application portals.

Illustrating by example, in FIG. 7 there were four user actuation targets (701,702,703,704) present on the exterior display (120) when the electronic device 100 was in the closed position (201). In a situation where the user 700 interacted, but did not dismiss, three of the notifications expanded from these user actuation targets, three interactive application portals 1201,1202,1203 would be presented on the interior display 105 when the first device housing 102 pivots relative to the second device housing 103 from the closed position (201) to the axially displaced open position 401, as shown in FIG. 12.

Figure 13:
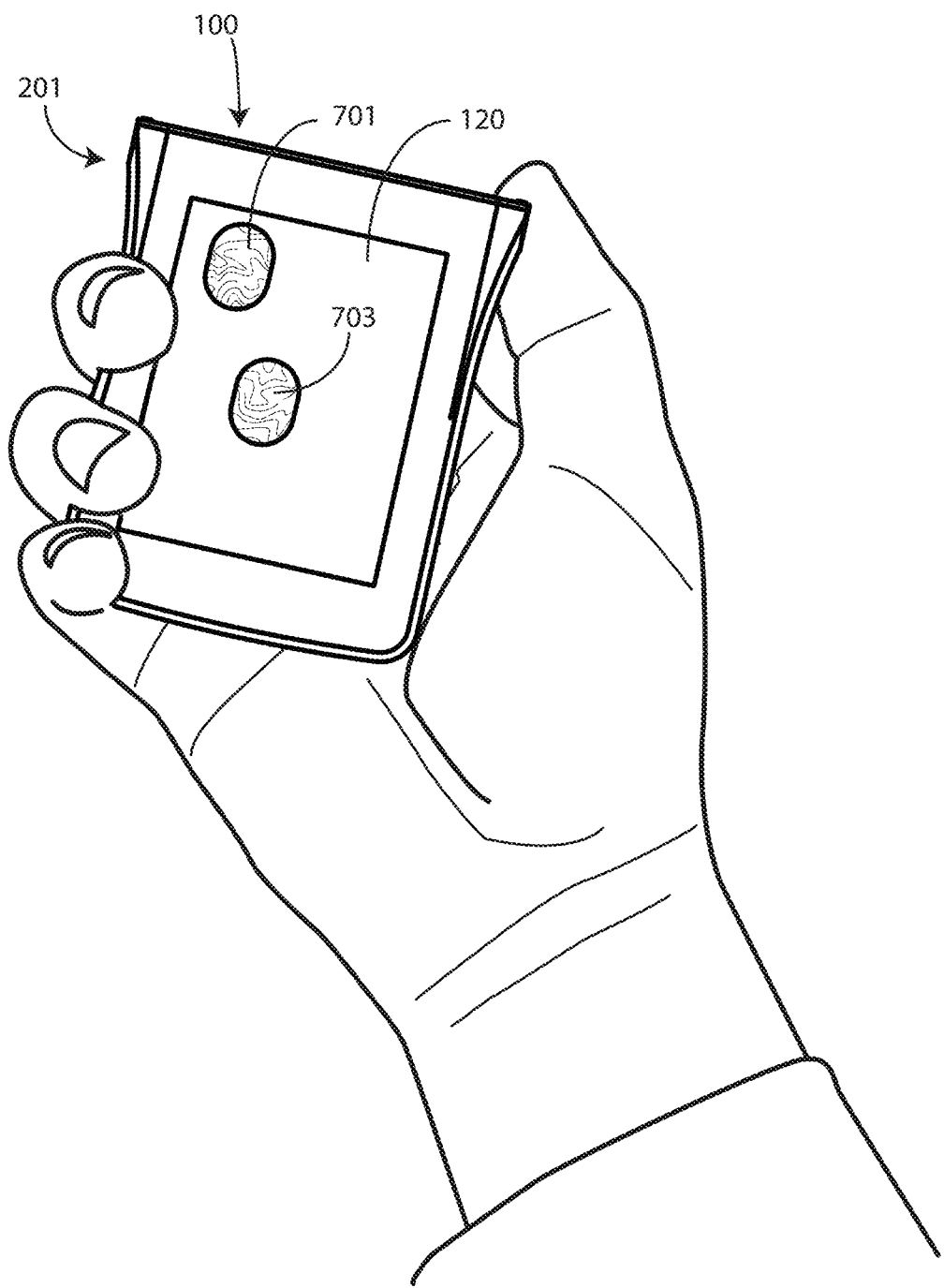
FIG. 13 illustrates one explanatory electronic device and one or more method steps in accordance with one or more embodiments of the disclosure.

Now presume that the user 700 interacts with two of those interactive application portals, e.g., interactive application portal 1202 and interactive application portal 1203. However, presume the user 700 fails to interact with interactive application portal 1201. In one or more embodiments, the one or more processors (112) further preserve the notification associated with interactive application portal 1201 for presentation on the exterior display (120) when the electronic device 100 returns to the closed position (201). Thus, as shown in FIG. 13, this results in two user actuation targets 701,703 being presented on the exterior display 120 when the electronic device 100 returns to the closed position 201.

Thus, as shown and described above with reference to FIGS. 7-13, in one or more embodiments an electronic device 100 includes a first device housing 102 coupled to a second device housing 103 by a hinge (101) such that the first device housing 102 is pivotable about the hinge (101) relative to the second device housing 103 between an axially displaced open position 401 and a closed position 201. An exterior display 120 is coupled to one of the first device housing 102 or the second device housing 103, with the exterior display 120 being exposed when the electronic device 100 is in the closed position 201.

At least one interior display, which can be display 105, displays (601,602), or other displays, is coupled to one or both of the first device housing 102 or the second device housing 103. This interior display concealed when the electronic device 100 is in the axially displaced open position 401 in one or more embodiments.

One or more processors (112) then detect user input interacting with two or more notifications 901,1101 presented on the exterior display 120 while the electronic device 100 is in the closed position 201, and thereafter, the first device housing 102 pivoting relative to the second device housing 103 to the axially displaced open position 401. In one or more embodiments, when this occurs the one or more processors present two or more interactive application portals 1201,1202 of two or more predefined applications (121,124) associated with the two or more notifications 901,1101 on the at least one interior display 120.

The one or more processors (112) can also detect other user input interacting with at least one interactive application portal. When this occurs, the one or more processors (112) can dismiss at least one notification associated with the at least one interactive application portal.

When the one or more processors (112) detect the first device housing 102 pivoting relative to the second device housing 103 after failing to detect other user input interacting with at least one other interactive application portal, the one or more processors (112) can again present at least one other notification associated with at least one other interactive application portal on the exterior display 120 when the electronic device 100 returns to the closed position 201.

Figure 14:
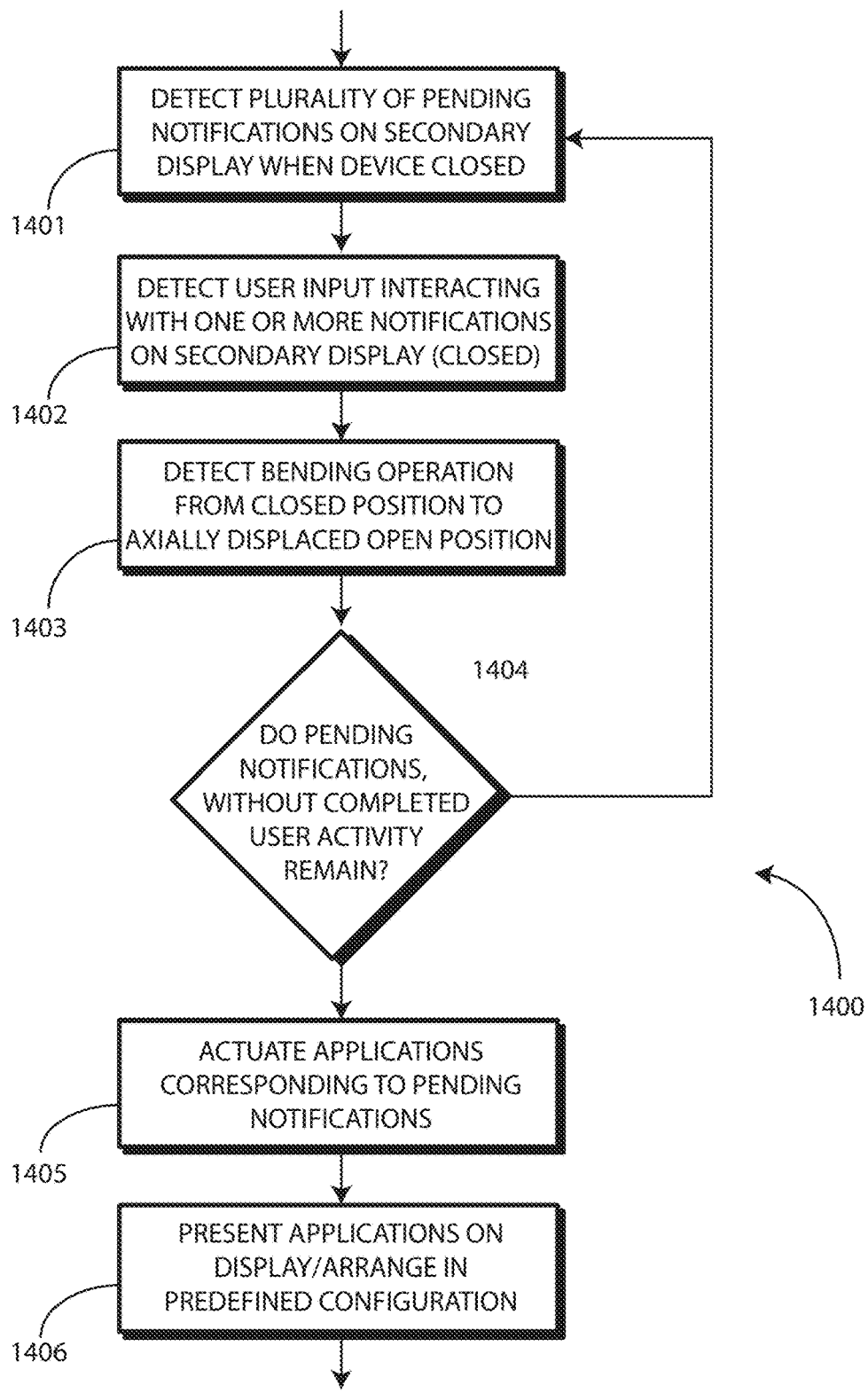
FIG. 14 illustrates one explanatory method in accordance with one or more embodiments of the disclosure.

One illustrative method for performing operations illustrated in FIGS. 7-13 is set forth in FIG. 14. Turning now to FIG. 14, at step 1401 the method 1400 determines that there are multiple pending notifications available for presentation on the exterior display of a bendable electronic device when the bendable electronic device is in a closed position with a first portion of the electronic device and a second portion of the electronic device abutting.

At step 1402, the method 1400 further determines that the user is interacting with the exterior display while the notifications are available for presentation. This user interaction can cause the notifications to be displayed in one or more embodiments, as was the case in the using the "peek" gesture above. Alternatively, the user interaction can occur within a notification, such as actuating an interactive element presented within the notification, or scrolling through the notification to obtain additional information.

At step 1403, the method 1400 detects a bending operation transitioning the electronic device from the closed position to the open position. Decision 1404 then determines whether any notifications have been partially interacted with by the user. The "partial" interaction is an interaction where the user has seen, and optionally interacted with, a notification, but not to an extent that the notification is dismissed. Where there are none, the method 1400 returns to step 1401.

Where there are such partially interacted notifications, the method 1400 moves to step 1405. In one or more embodiments, step 1405 includes actuating opening applications corresponding to the partially interacted notifications. Step 1406 then includes presenting interactive application portals of the applications on the interior display of the electronic device when it is in the open position.

The user thus has the option of interacting with the interactive application portals to access additional functionality of the applications corresponding to the notifications. If, for some reason, the user fails to interact with a presented application while the electronic device is in the open position, in one or more embodiments the one or more processors can restore notifications corresponding to those unused applications, making them available for presentation again on the exterior display when the bendable electronic device returns to the closed position.

Figure 15:
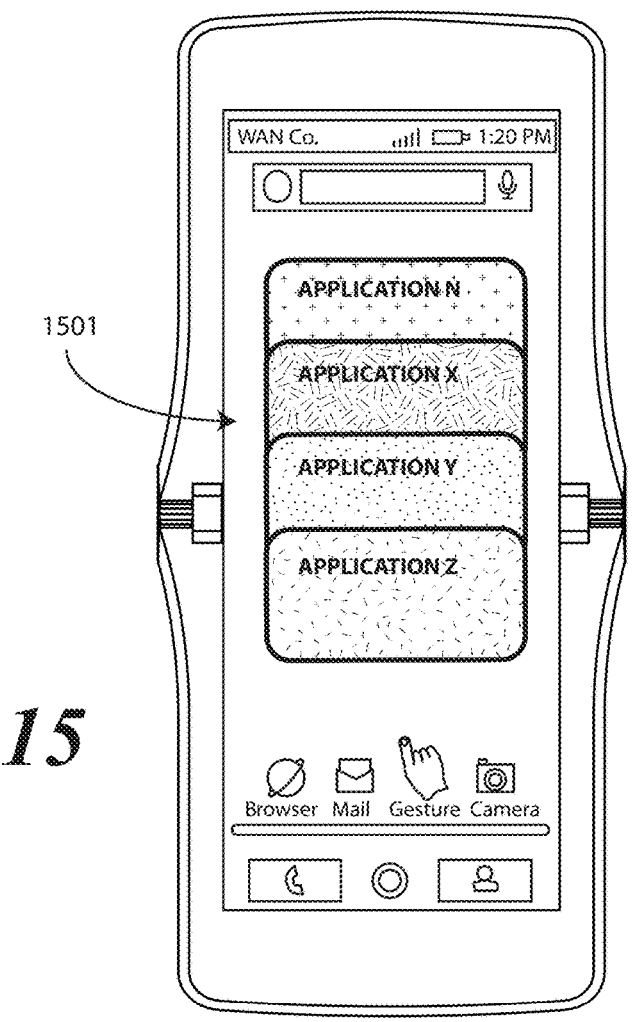
FIG. 15 illustrates one explanatory electronic device and one or more method steps in accordance with one or more embodiments of the disclosure.
Figure 16:
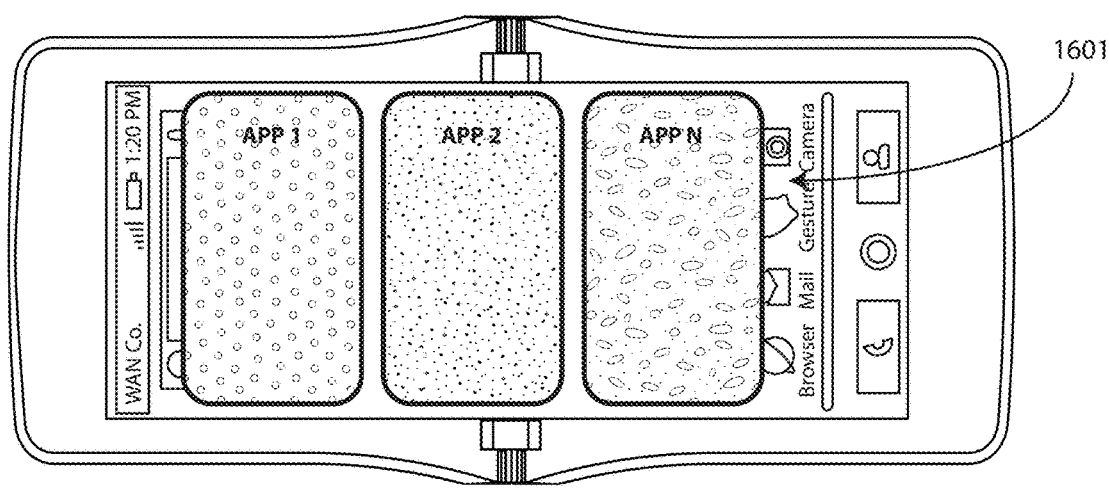
FIG. 16 illustrates one explanatory electronic device and one or more method steps in accordance with one or more embodiments of the disclosure.

It should be noted that the presentation of interactive application portals can be done in a variety of ways. Illustrating by example, where there are multiple applications corresponding to multiple notifications, the presented interactive application portals of these applications can be stacked, as shown in FIG. 12. In another embodiment, they can be tiled 1501, as shown in FIG. 15. In still another embodiment, they can be placed in a side-by-side arrangement 1601, as shown in FIG. 16. Other arrangements for the interactive application portals will be obvious to those of ordinary skill in the art having the benefit of this disclosure. For example, they can be arranged in another manner so as to make their presentation easily navigable and seamless.

The method 1400 of FIG. 14 thus allows, when an electronic device is transitioned from the closed position to the axially displaced open position, automatic actuation and launch of applications corresponding to the notifications the user saw, and optionally interacted with, when the electronic device is in the open position. Thus, the user instantly has access not only to the corresponding application, but a particular interactive application portal with which the user may access the increased functionality of the application for the information presented in the notification.

Figure 17:
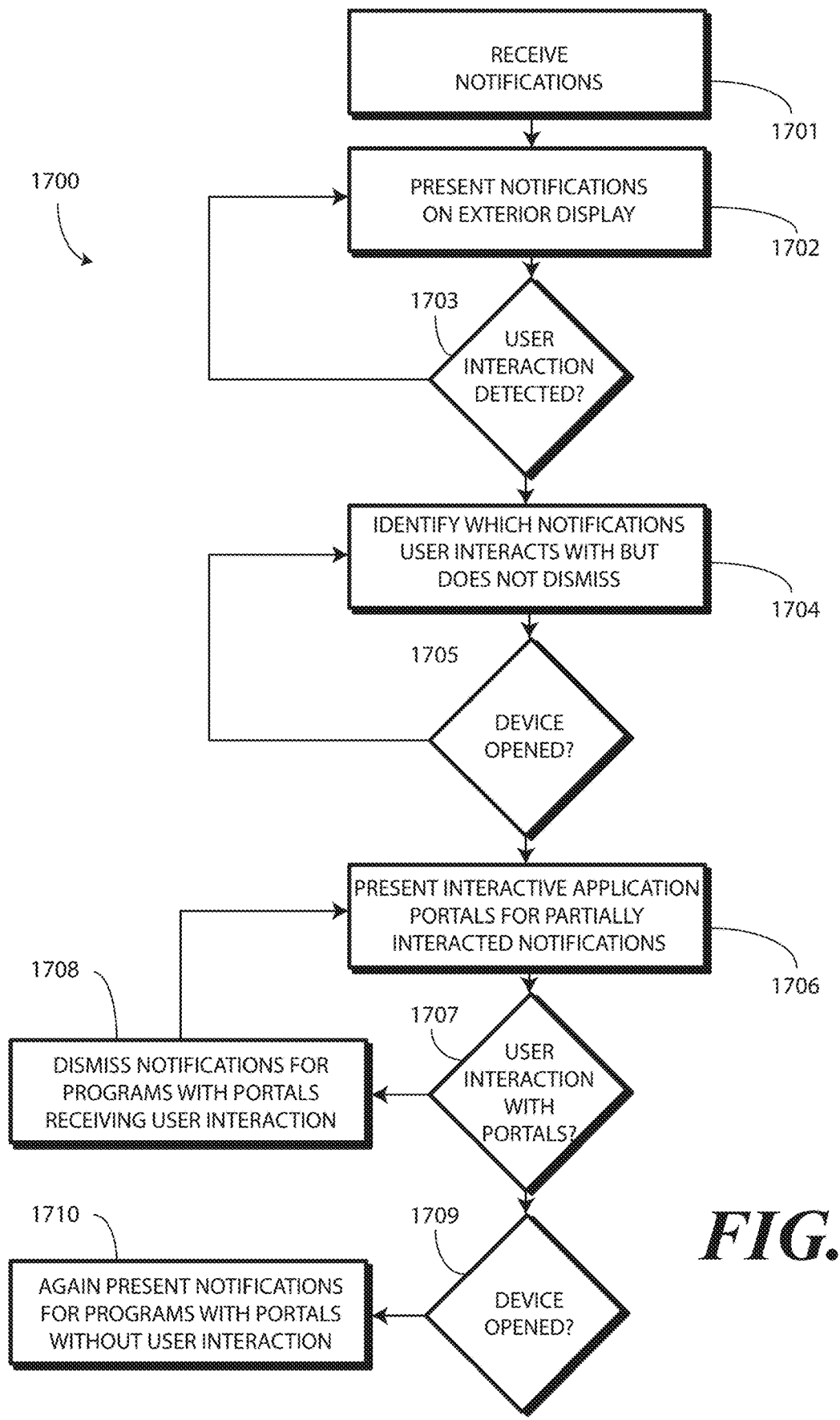
FIG. 17 illustrates one explanatory method in accordance with one or more embodiments of the disclosure.

Another illustrative method for performing operations illustrated in FIGS. 7-13 is set forth in FIG. 17. Turning now to FIG. 17, at step 1701 the method 1700 receives one or more notifications corresponding to one or more predefined applications operating on one or more processors of the electronic device. At step 1702, the method 1700 presents the one or more notifications on an exterior display of the electronic device.

Decision 1703 detects whether user input occurs at the exterior display interacting with one or more notifications present on the exterior display while a first device housing and a second device housing of the electronic device are pivoted about a hinge to a closed position. Where no user input is detected, the method 1700 returns to step 1702. Where user input interacting with one or more notifications present on the exterior display is detected, step 1704 determines which notifications the user has interacted with, but has not dismissed.

Decision 1705 detects whether the first device housing of the electronic device pivots about the hinge relative to the second device housing from the closed position to an axially displaced open position to reveal at least one interior display. In one or more embodiments, decision 1705 detects this while the one or more notifications are present on the exterior display. Where no opening of the electronic device is detected, the method 1700 returns to step 1704.

Where opening is detected, step 1706 includes presenting one or more interactive application portals associated with one or more applications generating the one or more notifications on the at least one interior display when the electronic device is in the axially displaced open position. Decision 1707 detects whether user input occurs at any of the one or more interactive application portals associated with one or more applications generating the one or more notifications. Where it does, step 1708 dismisses a presented notification associated with a presented interactive application portal upon detecting other user input at the at least one interior display interacting with the presented interactive application portal.

Where there is an absence of user interaction with an interactive application portal, decision 1709 detects whether the first device housing of the electronic device pivots about the hinge relative to the second device housing from the axially displaced open position to the closed position. Where it does not, the method 1700 returns to decision 1707. Where it does, step 1710 comprises presenting remaining notifications associated with remaining interactive application portals failing to receive user input interaction on the exterior display.

Figure 18:
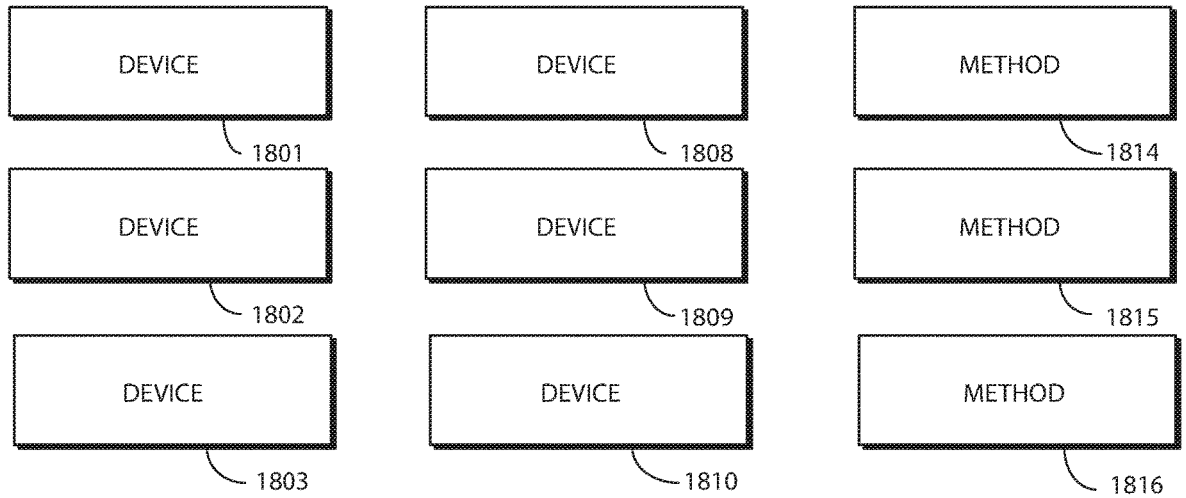
FIG. 18 illustrates one or more embodiments of the disclosure.
Figure 18:
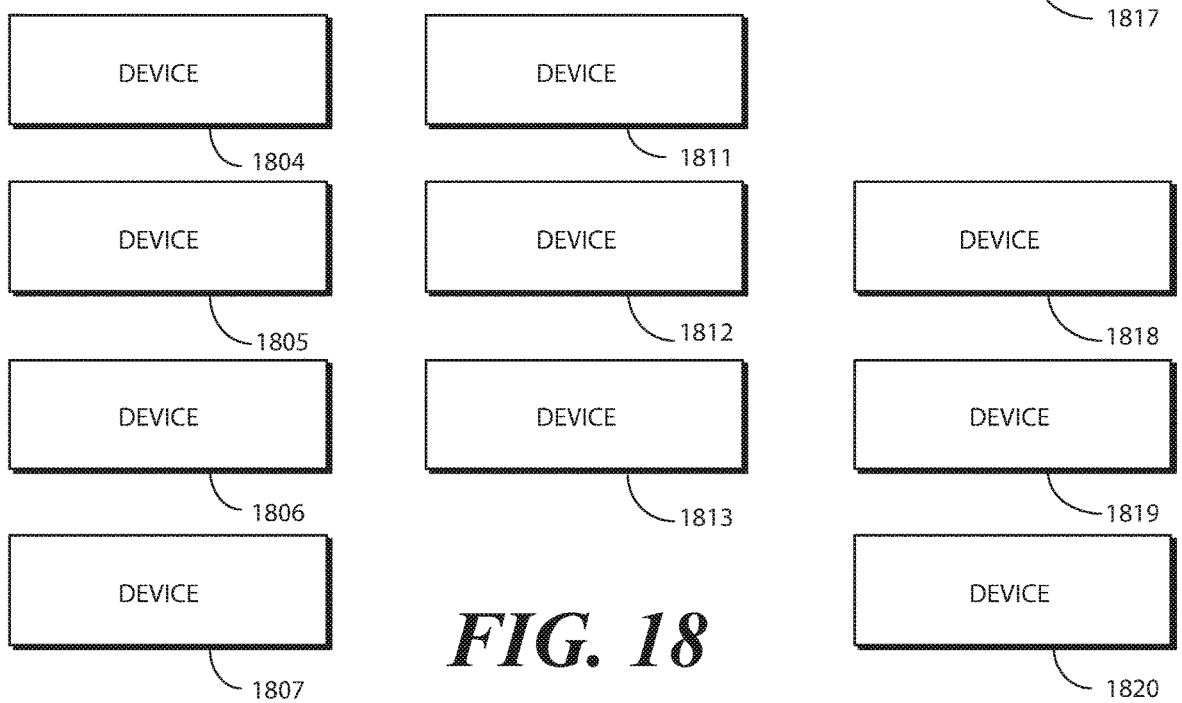

Turning now to FIG. 18, illustrated therein are various embodiments of the disclosure. At 1801, an electronic device comprises a first device housing and a second device housing. At 1801, the electronic device comprises a hinge coupling the first device housing to the second device housing. At 1801, the first device housing is pivotable about the hinge relative to the electronic device between a closed position and an axially disposed open position.

At 1801, the electronic device comprises a display coupled to one of the first device housing or the second device housing. At 1801, the display is exposed when the first device housing and the second device housing are in the closed position.

At 1801, the electronic device comprises at least one other display coupled to one of the first device housing or the second device housing. At 1801, the at least one other display is concealed when the first device housing and the second device housing are in the closed position.

At 1801, the electronic device comprises one or more processors operable with the display and the at least one other display. At 1801, the one or more processors detect user input interacting with at least one user actuation target associated with a predefined application operating on the one or more processors present on the display when the first device housing and the second device housing are in the closed position. At 1801, the one or more processors, upon detecting the first device housing pivoting relative to the second device housing from the closed position to the axially displaced open position, present an interactive application portal of the predefined application on the at least one other display.

At 1802, the one or more processors of 1801 present the interactive application portal of the predefined application on the at least one other display only when the at least one user actuation target associated therewith is present on the display when the first device housing pivots relative to the second device housing from the closed position to the axially displaced open position. At 1803, the at least one user actuation target of 1801 comprises an indication of a notification generated by the predefined application.

At 1804, the user input of 1803 interacting with the at least one user actuation target causes the notification to expand, thereby revealing additional notification information. At 1805, the at least one user actuation target of 1803 comprises two or more user actuation targets associated with two or more predefined applications. At 1806, the one or more processors of 1805 present two or more interactive application portals of the two or more predefined applications on the at least one other display upon detecting the first device housing pivoting relative to the second device housing from the closed position to the axially displaced open position. At 1807, the one or more processors of 1806 arrange the two or more interactive application portals on the at least one other display in one of a stacked configuration, a tiled configuration, or a side-by-side configuration.

At 1808, the notification of 1806 comprises at least one interactive element dismissing the notification in response to an interaction event occurring at the at least one interactive element. At 1809, the one or more processors of 1808 preclude presenting interactive application portals of applications corresponding to notifications dismissed by the interaction event occurring at the at least one interactive element.

At 1810, the one or more processors of 1806 further detect another user input interacting with one or more interactive application portals of the two or more interactive application portals. At 1810, the one or more processors dismiss notifications associated with the one or more interactive application portals. At 1811, the one or more processors of 1810 further preserve other notifications associated with other interactive application portals upon failing to detect the another user input interacting with the other interactive application portals for presentation on the display when the electronic device returns to the closed position.

At 1812, the at least one other display of 1806 comprises a first display coupled to the first device housing and a second display coupled to the second device housing. At 1813, the at least one other display of 1806 comprises a flexible display coupled to the first device housing and the second device housing and spanning the hinge.

At 1814, a method in an electronic device comprises detecting, with one or more processors operable with an exterior display of a hinged electronic device, user input at the exterior display interacting with one or more notifications present on the exterior display while a first device housing and a second device housing of the electronic device are pivoted about a hinge to a closed position. At 1814, the method comprises also detecting, with the one or more processors, the first device housing of the electronic device pivoting about the hinge relative to the second device housing from the closed position to an axially displaced open position to reveal at least one interior display while the one or more notifications are present on the exterior display. At 1814, the method comprises presenting one or more interactive application portals associated with one or more applications generating the one or more notifications on the at least one interior display when the electronic device is in the axially displaced open position.

At 1815, the method of 1814 further comprises the one or more processors dismissing a presented notification associated with a presented interactive application portal upon detecting other user input at the at least one interior display interacting with the presented interactive application portal. At 1816, the method of 1815 further comprises detecting, with the one or more processors, the first device housing of the electronic device pivoting about the hinge relative to the second device housing from the axially displaced open position to the closed position. At 1816, the method comprises presenting remaining notifications associated with remaining interactive application portals failing to receive user input interaction on the exterior display.

At 1817, an electronic device comprises a first device housing coupled to a second device housing by a hinge such that the first device housing is pivotable about the hinge relative to the second device housing between an axially displaced open position and a closed position. At 1817, the electronic device comprises an exterior display coupled to one of the first device housing or the second device housing. At 1817, the exterior display is exposed when the electronic device is in the closed position.

At 1817, the electronic device comprises at least one interior display coupled to the one of the first device housing or the second device housing. At 1817, the at least one interior display is concealed when the electronic device is in the axially displaced open position.

At 1817, the electronic device comprises one or more processors operable with the exterior display and the at least one interior display. At 1817, the one or more processors detect user input interacting with two or more notifications presented on the exterior display while the electronic device is in the closed position, and thereafter the first device housing pivoting relative to the second device housing to the axially displaced open position. At 1817, the one or more processors present two or more interactive application portals of two or more predefined applications associated with the two or more notifications on the at least one interior display.

At 1818, the one or more processors of 1817 detect other user input interacting with at least one interactive application portal. At 1818, the one or more processors dismiss at least one notification associated with the at least one interactive application portal.

At 1819, the one or more processors of 1818 detect the first device housing pivoting relative to the second device housing after failing to detect other user input interacting with at least one other interactive application portal. At 1819, the one or more processors again present at least one other notification associated with the at least one other interactive application portal on the exterior display when the electronic device returns to the closed position. At 1820, the at least one interior display of 1819 comprises a flexible display spanning the hinge.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, in still another embodiment of the disclosure an electronic device is operable in two states where a secondary screen is active and operable when the device is in a foldable state, but the primary screen is active when the device is in an open state. The device can include a processor and a computer-readable storage medium having stored thereon multiple instructions that, responsive to execution by the processor, cause the processor to perform actions.

In one or more embodiments these actions comprise determining that device has multiple pending notifications on the secondary display, determining that user is interacting in the notification panel in the secondary display, determining that while being on the notification panel in the secondary display, the user takes an action to move from secondary display (example: flip open the device which in turn lead to opening) to the primary display; and determining that there are pending notifications which have not been consumed. Where this is the case, the actions can comprise taking pending intents on notification clicks actions in the primary display using multi-window display functionalities.

In one embodiment, on opening the primary display, the applications are stacked up as recent applications. In one embodiment, unconsumed applications opened in the multi-window are restored back as pending notifications on folding the device.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first device housing and a second device housing;
   a hinge coupling the first device housing to the second device housing, the first device housing pivotable about the hinge relative to the electronic device between a closed position and an axially disposed open position;
   a display coupled to one of the first device housing or the second device housing, the display exposed when the first device housing and the second device housing are in the closed position;
   at least one other display coupled to the one of the first device housing or the second device housing, the at least one other display concealed when the first device housing and the second device housing are in the closed position; and
   one or more processors operable with the display and the at least one other display, the one or more processors detecting user input interacting with at least one user actuation target associated with a predefined application operating on the one or more processors and present on the display when the first device housing and the second device housing are in the closed position and, upon detecting the first device housing pivoting relative to the second device housing from the closed position to the axially displaced open position, presenting an interactive application portal of the predefined application on the at least one other display;
   wherein:
      the at least one user actuation target comprises two or more user actuation targets associated with two or more predefined applications; and
      the one or more processors present two or more interactive application portals of the two or more predefined applications on the at least one other display when the first device housing pivots relative to the second device housing from the closed position to the axially displaced open position.

2. The electronic device of claim 1, the two or more user actuation targets represented by user actuation targets.

3. The electronic device of claim 1, the interactive application portal providing an interactive computing environment.

4. The electronic device of claim 1, the one or more processors further detecting another user input interacting with one or more interactive application portals of the two or more interactive application portals, and dismissing notifications associated with the one or more interactive application portals.

5. The electronic device of claim 4, the one or more processors further preserving other notifications associated with other interactive application portals upon failing to detect the another user input interacting with the other interactive application portals for presentation on the display when the electronic device returns to the closed position.

6. The electronic device of claim 1, the one or more processors arranging the two or more interactive application portals on the at least one other display in a stacked configuration.

7. The electronic device of claim 1, the one or more processors arranging the two or more interactive application portals on the at least one other display in a tiled configuration.

8. The electronic device of claim 1, the one or more processors arranging the two or more interactive application portals on the at least one other display in a side-by-side configuration.

9. The electronic device of claim 1, the at least one user actuation target comprising an indication of a notification generated by the predefined application.

10. The electronic device of claim 9, the one or more processors presenting the interactive application portal of the predefined application on the at least one other display only when the at least one user actuation target associated therewith is present on the display when the first device housing pivots relative to the second device housing from the closed position to the axially displaced open position.

11. The electronic device of claim 9, the user input interacting with the at least one user actuation target causing the notification to expand, thereby revealing additional notification information.

12. The electronic device of claim 9, the notification comprising at least one interactive element dismissing the notification in response to an interaction event occurring at the at least one interactive element.

13. The electronic device of claim 12, one or more processors precluding presenting interactive application portals of applications corresponding to notifications dismissed by the interaction event occurring at the at least one interactive element.

14. An electronic device, comprising:
    a first device housing coupled to a second device housing by a hinge such that the first device housing is pivotable about the hinge relative to the second device housing between an axially displaced open position and a closed position;
    an exterior display coupled to one of the first device housing or the second device housing;
    at least one interior display coupled to the one of the first device housing or the second device housing; and
    one or more processors operable with the exterior display and the at least one interior display, the one or more processors:
       detecting user input interacting with two or more notifications presented on the exterior display while the electronic device is in the closed position, and thereafter the first device housing pivoting relative to the second device housing to the axially displaced open position; and
       presenting two or more interactive application portals of two or more predefined applications associated with the two or more notifications on the at least one interior display.

15. The electronic device of claim 14, the one or more processors detecting other user input interacting with at least one interactive application portal and dismissing at least one notification associated with the at least one interactive application portal.

16. The electronic device of claim 15, the one or more processors detecting the first device housing pivoting relative to the second device housing after failing to detect other user input interacting with at least one other interactive application portal and again presenting at least one other notification associated with the at least one other interactive application portal on the exterior display when the electronic device returns to the closed position.

17. The electronic device of claim 16, the at least one interior display comprising a flexible display spanning the hinge.

18. The electronic device of claim 14, at least one interior display comprising a flexible display.

19. The electronic device of claim 14, the two or more notifications represented by user actuation targets.

20. The electronic device of claim 14, wherein the at least one interior display is larger than the exterior display.

* * * * *